United States Patent
Picard et al.

(10) Patent No.: US 8,913,299 B2
(45) Date of Patent: Dec. 16, 2014

(54) DOCUMENT SECURIZATION METHOD AND A DOCUMENT SECURIZATION DEVICE USING PRINTING A DISTRIBUTION OF DOTS ON SAID DOCUMENT

(71) Applicant: Advanced Track and Trace, Rueil-Malmaison (FR)

(72) Inventors: Justin Picard, Rueil-Malmaison (FR); Jean-Pierre Massicot, Rueil-Malmaison (FR); Alain Foucou, Rueil-Malmaison (FR); Zbigniew Sagan, Rueil-Malmaison (FR)

(73) Assignee: Advanced Track and Trace, Rueil-Malmaison (FR)

( * ) Notice: Subject to any disclaimer, the term of this patent is extended or adjusted under 35 U.S.C. 154(b) by 0 days.

(21) Appl. No.: 14/057,304

(22) Filed: Oct. 18, 2013

(65) Prior Publication Data
US 2014/0112525 A1    Apr. 24, 2014

Related U.S. Application Data

(62) Division of application No. 12/602,596, filed as application No. PCT/FR2008/000743 on Jun. 2, 2008, now Pat. No. 8,593,696.

(30) Foreign Application Priority Data

Jun. 1, 2007  (FR) .................................. 07 03922
Jun. 1, 2007  (WO) ................. PCT/FR2007/000918

(51) Int. Cl.

| H04N 1/32   | (2006.01) |
|-------------|-----------|
| G06K 19/06  | (2006.01) |
| B41M 3/14   | (2006.01) |
| G06F 21/60  | (2013.01) |
| H04N 1/00   | (2006.01) |
| G06K 19/10  | (2006.01) |
| G06K 9/00   | (2006.01) |
| G03G 21/04  | (2006.01) |
| G06T 1/00   | (2006.01) |
| G06K 19/08  | (2006.01) |

(52) U.S. Cl.
CPC .............. *G06T 1/005* (2013.01); *G06K 19/10* (2013.01); *H04N 2201/327* (2013.01); *G06K 19/06046* (2013.01); *G06F 21/608* (2013.01); *G06K 16/06037* (2013.01); *G03G 2215/00299* (2013.01); *G06K 9/00* (2013.01); *G03G 21/046* (2013.01); *H04N 1/3232* (2013.01); *G06K 19/086* (2013.01); *H04N 1/32203* (2013.01); *G06K 9/00577* (2013.01); *H04N 1/0087* (2013.01); *G06K 19/06178* (2013.01); *H04N 1/32272* (2013.01); *Y10S 283/902* (2013.01)
USPC .......... 358/3.28; 382/100; 358/1.14; 283/93; 283/902

(58) Field of Classification Search
None
See application file for complete search history.

(56) References Cited

U.S. PATENT DOCUMENTS

| 6,692,031 B2 * | 2/2004 | McGrew ........................ 283/93 |
| 7,965,862 B2 * | 6/2011 | Jordan et al. .................. 382/100 |

(Continued)

FOREIGN PATENT DOCUMENTS

EP    1 672 593    6/2006

OTHER PUBLICATIONS

International Search Report dated Apr. 3, 2009, from corresponding PCT application.

*Primary Examiner* — Scott A Rogers
(74) *Attorney, Agent, or Firm* — Young & Thompson

(57) ABSTRACT

An analogical mark printed on a document that includes a distribution of dots defined by a digital file, having, as a result of unanticipated unknowns in printing, an unpredictable variation, dot by dot, of at least one geometric characteristic of the printed dots where dots of the distribution of dots have, in the digital file, at least one geometric characteristic that digitally varies among dots, the geometric amplitude of the digital variation having the order of magnitude of said unpredictable variation and being less than an average dimension of the dots of the distribution of dots.

18 Claims, 32 Drawing Sheets

(56) References Cited

U.S. PATENT DOCUMENTS

Figure 1:
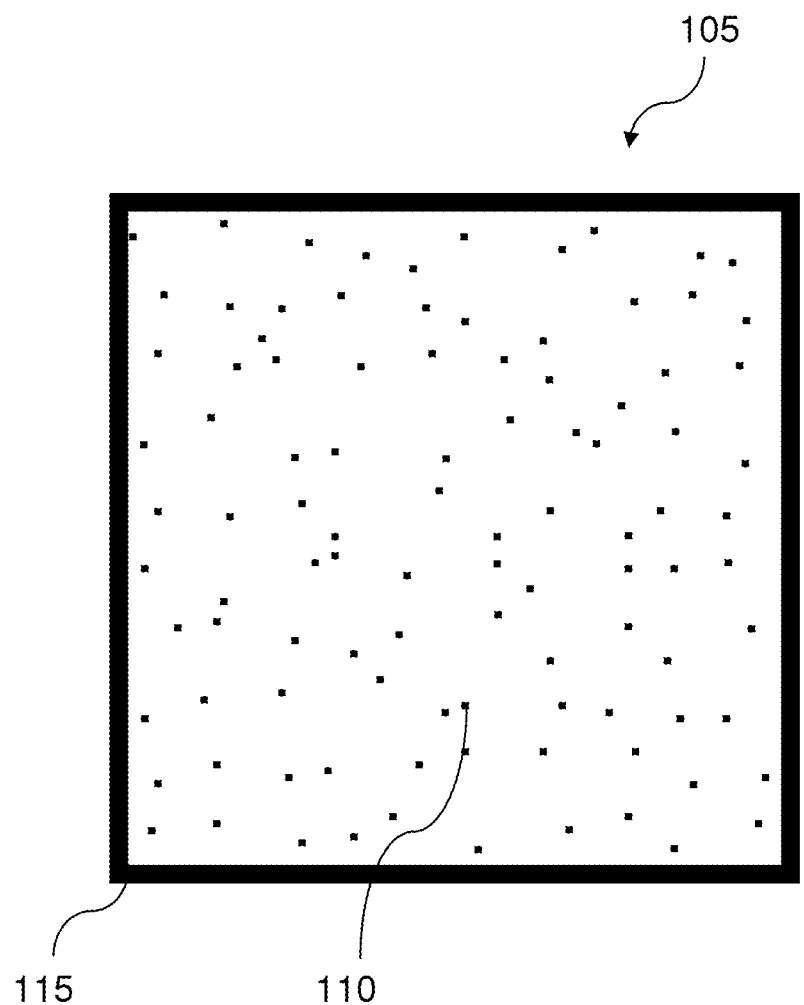

| | | |
|---|---|---|
| 8,345,315 B2 | 1/2013 | Sagan et al. |
| 8,498,022 B2 * | 7/2013 | Massicot et al. ............. 358/3.28 |
| 8,634,066 B1 * | 1/2014 | Fraser ........................... 358/3.28 |
| 8,638,476 B2 * | 1/2014 | Massicot et al. ............. 358/3.28 |
| 2008/0198216 A1 * | 8/2008 | Masui et al. ................... 235/494 |
| 2010/0014122 A1 | 1/2010 | Massicot et al. |
| 2011/0142294 A1 | 6/2011 | Sagan et al. |
| 2012/0327450 A1 | 12/2012 | Sagan et al. |

\* cited by examiner 155  156

DOCUMENT SECURIZATION METHOD AND A DOCUMENT SECURIZATION DEVICE USING PRINTING A DISTRIBUTION OF DOTS ON SAID DOCUMENT

This invention concerns a process and a device for securing documents. It envisages, in particular, identifying a document in a unique way, authenticating it, i.e. being able to detect its copying and/or carrying, on the document, information relative to this document, for example information identifying an owner of intellectual property rights connected to the document and/or its place of manufacture. The term document includes all data carriers, for example hardcopy documents, blueprints, packaging, manufactured items, molded items and cards, e.g. identification cards or bankcards.

The different types of document printing are divided into two groups: one known as "static", in which each document receives noticeably the same printed mark, for example an "offset" analog print process, and the second known as "serialized" digital, in which each document receives an individualized item of information, for example an ink-jet print process controlled by an individualization program, and a process for printing a serial number.

For offset printing, which is one of the most commonly used print methods for boxes and packaging, a plate is generated for each color printed in the document, and this plate's content is printed hundreds of thousands, even millions, of times. In this case, the same content, inserted on the printing plate, is printed on every document for every print. Flexography, typography and gravure printing are other examples of what are called static printing methods. In static printing documents cannot be identified individually, in theory, since the same mark is printed each time. In addition, when the printing is static and makes use of analog processes, it is more difficult to control the exact number of documents printed. The risks of counterfeiting through printing a larger quantity of documents than the owner of the rights has authorized are therefore significant. How can you ensure that the number of prints specified by the manufacturing order, often less than the plate's usage limit, has been respected? How can you ensure that all the unused prints (start or end of the series, faults, order cancelled, etc) and all the plates, films and other objects that allow the documents to be reconstituted never fall into the hands of counterfeiters?

Serialized printing, by allowing each document to be precisely and unequivocally identified, is generally preferable to static printing. In effect, each identifier being only printed once in serialized printing, reading a double means that an alarm can be triggered: a double is an identifier that is identical to a previously read identifier.

In a general way, there are several points to be made secure in order to protect identifier and/or anti-copying marks: the source file, possibly the CAP file that contains it, and, in the case of offset printing, the plates and any films.

It is possible to perform the equivalent of serialized printing of an anti-copying mark on an item already printed statically by, in a second step, printing a unique code or serial number that is uncoded or, preferably, encrypted. This serialized printing can, for example, take the form of a two-dimensional bar code. Outwardly, this procedure makes it possible to track each document individually and at the same time retain a sure way of detecting copies. Stolen documents that have not received the serialized print would not bear a valid identifier.

This approach does not, however, solve all the problems. In effect, while a wrongdoer cannot identify the falsified documents as the printer would have done, the unique code printed by the serialization printer, generally offering a limited print quality, is not protected against copying.

Counterfeiters having in their possession documents to be identified as authentic can therefore copy one or more valid unique codes and re-copy them onto documents to be identified as authentic.

The prior state of the art contains several methods exploiting measurable physical characteristics in order to characterize and identify each document in a unique way. In general, the measurable physical characteristics chosen are of a random nature, and according to the actual state of the art and technologies cannot be copied, at least not in a cost-effective way. These methods enable all the documents considered "valid" to be controlled: only those documents for which the physical characteristics, comprising a unique set, have been memorized are considered valid.

For example, U.S. Pat. No. 4,423,415 describes a method enabling a sheet of paper to be identified according to its local transparency characteristics. Several other procedures are based on inputting unique and non-reproducible physical attributes of the material in order to generate a unique and non-transferable signature of said document. For example, documents WO 2006 016114 and US 2006/104103 are based on the measurement of the diffraction pattern induced by a laser ray applied to a precise area of the object.

Although they offer an interesting solution to the problems mentioned above, the approaches based on extracting a signature from the material are difficult to use for a number of reasons. Firstly, recording signatures when the documents are produced requires a costly optical reader and is difficult to integrate into production lines. These latter may, moreover, have very high working speeds. In a general way, it seems that these techniques are only applicable to small-scale production. In addition, the reader used for checking, in the field, is also too costly for a number of applications. It is also bulky and not easy to use, while often the checks in the field must be done rapidly and unobtrusively. Finally, it is not possible to extract a unique signature for all materials: glass and objects that are too reflective are excluded, in particular, at least for measurements of a laser's diffraction.

This invention aims to remedy these inconveniences and in particular the difficulties and limitations of applying known identification methods based on the unique physical attributes of the document's matter.

The digital authentication codes, also called "DAC" below, are digital images that, once marked on a medium, for example by printing or local modification of the medium, are designed so that some of their characteristics, generally automatically measurable from a captured image, are modified if a marked image is copied. The digital authentication codes are generally based on the degradation of one or more signals sensitive to copying during the copy step, a signal being borne by image elements with measurable characteristics sensitive to copying. Certain types of digital authentication codes can also contain information allowing the document containing it to be identified or tracked.

There are several types of digital authentication codes. The copy detection patterns, also called "CDP" below, are dense images, generally of a pseudo-random nature. Their reading principle is based on an image comparison in order to measure an index of similarity (or dissimilarity) between the original copy detection pattern and the copy detection pattern captured, for example by an image sensor: if this captured image is a copy it will have a lower index of similarity than if it is an original.

Like the two-dimensional bar codes, the secured information matrices, also called "SIM" below, are images designed to carry a large quantity of information in a robust way. However, unlike two-dimensional bar codes, secured information matrices are sensitive to copying. On reading, an error rate is measured for the coded message extracted from the matrix, a rate that is higher for the copies than the originals, which allows these copies to be distinguished from original prints.

Unless marked in a special way, for example with invisible ink, the copy detection patterns and secured information matrices are visible. In addition, marking the copy detection patterns and secured information matrices in an invisible way is not always possible, due to cost or manufacturing constraints. The visibility of an anti-copying mark can be a disadvantage in terms of esthetics and, in certain cases, security since the counterfeiter is informed of their presence.

There are also digital authentication codes that are naturally invisible or at least difficult to see.

For example, some digital marks (known under the name "watermarks") integrated into printed images are designed so as to be damaged when the printed image is reproduced, for example by photocopying. The measurement of the digital watermark's degree of deterioration, lower in the original print than in a copy of it, makes it possible to detect these copies.

The combination of several watermarks with different degrees of sensitivity to copying makes it possible, by comparing the respective energy levels, to detect the copies. Integrating digital watermarks in the production procedures of documents is, however, more complex, which limits their use: in effect, unlike copy detection patterns and secured information matrices, the digital watermark cannot be simply "added" to the image; the digital watermark is, in fact, a complex function of the message to be added and of the original image, the digital watermark's energy being locally adjusted according to the original image's masking properties. Integrating digital watermarks in documents or products entails sending the source image to a marking/printing central processing unit that integrates the digital watermark and sends back a marked image. This procedure is not very practical, because of the often large size of the files and related image security problems. In contrast, for marking/printing with a copy detection pattern or secured information matrix, the source image does not have to be sent to the marking/ printing central processing unit: conversely, it is the image of the copy detection pattern or secured information matrix, generally of a small size, for example several kilobytes, that is sent to the holder of the image files that will be affixed onto the document or product. In addition, it is very difficult to stabilize the reading of digital watermarks, which makes the determination of the copy from the original of a document more random. In effect, the risks of error are generally noticeably higher with digital watermarks than with copy detection patterns and secured information matrices.

There are also asymmetric modulation spatial marking processes, also called "AMSM" below, such as those described in documents WO 2006 087351 and CH 694 233. Just like digital watermarks, AMSMs allow documents to be marked invisibly, or at least unobtrusively. AMSMs are generally patterns of dots, which are added as an additional layer to the document to be marked. For example, in the case of an offset print process, an additional plate bearing only the AMSMs is overprinted on the document. In this way, the AMSMs are more easily integrated than digital watermarks into the document production process, the source image not being required by the marking/printing central processing unit. However, unlike copy detection patterns and secured information matrices, the AMSMs generally require an additional plate and ink, which makes their use more complex and more costly. In addition, just like digital watermarks the AMSM detection methods can be imprecise. In fact, it is known that the marking/printing entails an analog uncertainty concerning the precise positioning of the marked image. This uncertainty, at the level of the dimension of the printed elementary dot, even below this, has a not insignificant effect on the detection of copies when the surface marked has a significant size. However, AMSM detection methods, based on auto-correlation and cross-correlation, cannot take this uncertainty of position into account. This increases the imprecision in reading the mark and, as a consequence, reduces the ability to distinguish between the originals and the copies.

When the capture is done by flat-bed scanners, allowing both a large capture surface and a sufficient capture resolution, the AMSMs enable simple copies to be detected, for example photocopies, even high-quality photocopies done by capture with a high-precision or high-resolution scanner, followed by reprinting. Nevertheless, in the face of a determined counterfeiter, AMSMs offer reduced protection against copying. In effect, after the high-resolution capture the counterfeiter can use manual image processing tools, such as "Photoshop" (registered trademark), possibly combined with automatic image processing tools (such as "Matlab", registered trademark), in order to restore all the detected dots in their initial form. In the case of a high-quality copy, the dots will no longer be weaker in the copied mark than in the original mark, and the copy has a strong chance of not being detected as a copy. Thus, a determined counterfeiter can generally make an identical copy of the information contained in an AMSM, which means that this method cannot be considered secure in the long term.

For the most commonly used print methods (in particular offset), the AMSMs (and other digital authentication codes) are printed statically. As the types of printing most commonly used for AMSMs and digital authentication codes are static, it is not possible to vary the mark and the contained message on each print.

Nevertheless, it may be desirable to be able to uniquely characterize, and thus identify, each print from a single source image. Similarly, it would be desirable to identify the printing plate that was used to print a document, so that these documents can be traced.

The present invention aims to remedy all or part of the inconveniences described above.

To this end, according to a first aspect, the present invention envisages a process for securing a document, that comprises:
  a step of printing a distribution of dots on said document, said printing, as a result of unanticipated unknowns in printing, causing an unpredictable variation, dot by dot, of at least one geometric characteristic of the printed dots and
  prior to said print step, a step of generating said distribution of dots so that dots of said distribution have at least one geometric characteristic that varies among dots, the geometric amplitude of the generated variation having the order of magnitude of said unpredictable variation.

Thanks to these provisions, the variations simulate print faults as of the digital image being generated. The potential counterfeiter cannot therefore distinguish the faults resulting from the printing of the generated variations. He/she cannot therefore correct them to obtain an original identical to the digital image generated.

According to particular features, during the step generating the dot distribution, the geometric amplitude of the generated variations is less than the dimension of the dots.

In this way the effectiveness of the process that is the subject of the present invention is increased.

According to particular features, during the step generating the dot distribution, a dot distribution is generated according to the unpredictable variation of the printing system used. It is noted here that the variation due to printing is cannot be predicted on a dot-by-dot-basis, but a statistical analysis allows its average magnitude, which is relatively stable, to be known.

According to particular features, during the generation step, dots of the dot distribution have at least one variable geometric characteristic, said variation not being repetitive in said dot distribution.

In this way the difficulty is increased of determining which dots have been changed by an unpredictable print variation.

According to particular features, during the generation step, in said dot distribution at least half the dots of said distribution are not laterally juxtaposed to four other dots of said dot distribution.

According to particular features, during the step generating the dot distribution, more than half the dots do not touch any other dot of said distribution.

Thanks to each of these provisions, having the effectiveness of the present invention harmed by the influences between the juxtaposed dot prints is avoided.

According to particular features, said generated variation corresponds to a variation in the position of dots, in at least one direction, with respect to a position where the centers of the dots are aligned on parallel lines perpendicular to said direction and separated by at least one dimension of said dots in that direction.

According to particular features, said generated variation corresponds to a variation in at least one dimension of dots, in at least one direction with respect to an average dimension of said dots in that direction.

According to particular features, said generated variation corresponds to a variation in shape of the dots with respect to an average shape of said dots in that direction.

According to particular features, during the generation step, said dot distribution represents coded information.

A message is thus inserted in the generated dot distribution.

According to particular features, the process that is the subject of the present invention, as described in brief above, comprises a step of capturing the image of the printed dot distribution and a step of determining a unique signature of said printed distribution, according to said unpredictable print variation.

Thanks to these provisions, each document printed can be identified.

According to particular features, the process that is the subject of the present invention, as described in brief above, comprises a step determining a magnitude representing the unpredictable print variation, the step generating the dot distribution being a function of said magnitude.

According to particular features, the process that is the subject of the present invention, as described in brief above, comprises a step of detecting a copy according to the magnitude representing the unpredictable print variation, said copy detection step comprising a step of comparing said representative magnitude against a pre-defined value, and a step of deciding the authenticity of the document according to the result of the comparison.

According to a second aspect, the present invention envisages a device for securing a document, characterized in that it comprises:

a means for printing a distribution of dots on said document, designed so that said printing, as a result of unanticipated unknowns in printing, causes an unpredictable variation, dot by dot, of at least one geometric characteristic of the printed dots and a means for generating said distribution adapted, prior to the printing, to generate said distribution of dots so that dots of said distribution have at least one geometric characteristic that varies among dots, the geometric amplitude of the generated variation having the order of magnitude of said unpredictable variation.

According to a third aspect, the present invention envisages a process for reading a distribution of dots on a document, characterized in that it comprises:

a step of capturing an image of said distribution of dots, a step of determining a physical magnitude representing a geometric variation of dots of said distribution, at least one geometric characteristic variation of at least one part of the dots of said dot distribution having the same order of magnitude as the average of the absolute value of an unpredictable variation, dot by dot, of at least one geometric characteristic of the printed dots, the variation coming from unanticipated unknowns in printing and a step of determining the authenticity of said dot distribution, according to said physical magnitude.

According to a fourth aspect, the present invention envisages a device for reading a distribution of dots on a document, characterized in that it comprises:

a means for capturing an image of said distribution of dots, a means for determining a physical magnitude representing a geometric variation of dots of said distribution, at least one geometric characteristic variation of at least one part of the dots of said dot distribution having the same order of magnitude as the average of the absolute value of an unpredictable variation, dot by dot, of at least one geometric characteristic of the printed dots, the variation coming from unanticipated unknowns in printing and a means for determining the authenticity of said dot distribution, according to said physical magnitude.

According to a fifth aspect, the present invention envisages a program that can be loaded in a computer system, said program containing instructions allowing the process that is the subject of the present invention, as described in brief above, to be utilized.

According to a sixth aspect, the present invention envisages a data carrier that can be read by a computer or microprocessor, removable or not, holding the instructions of a computer program, characterized in that it allows the process that is the subject of the present invention, as described in brief above, to be utilized.

As the particular characteristics, advantages and aims of this device, this reading process, this computer program and this data carrier are similar to those of the securization process that is the subject of this invention, as described in brief above, they are not repeated here.

Figure 2:
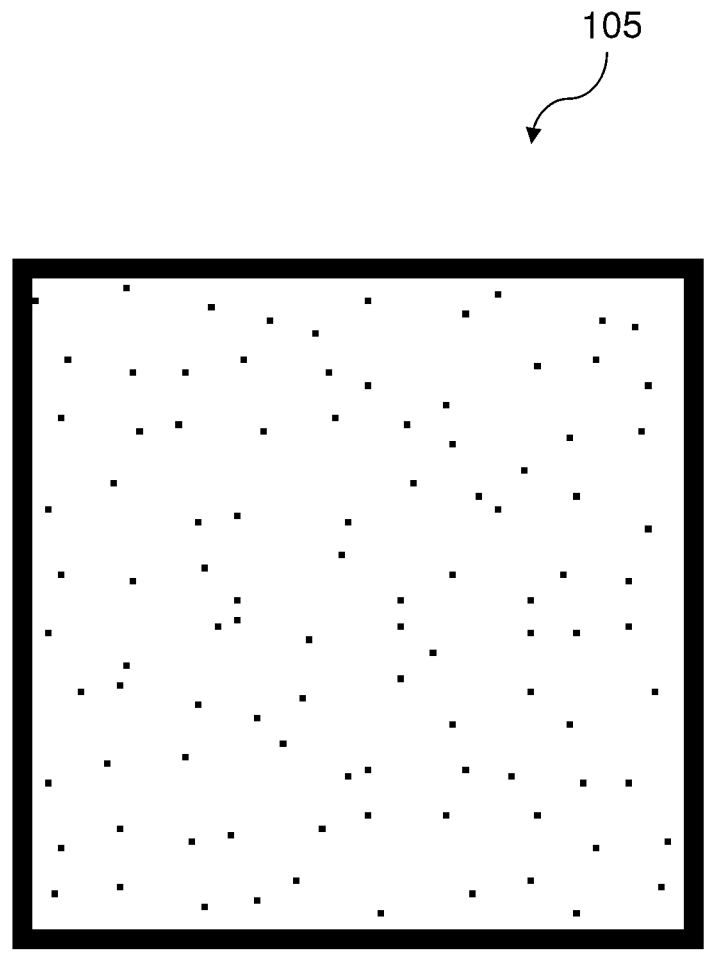
Figure 3:
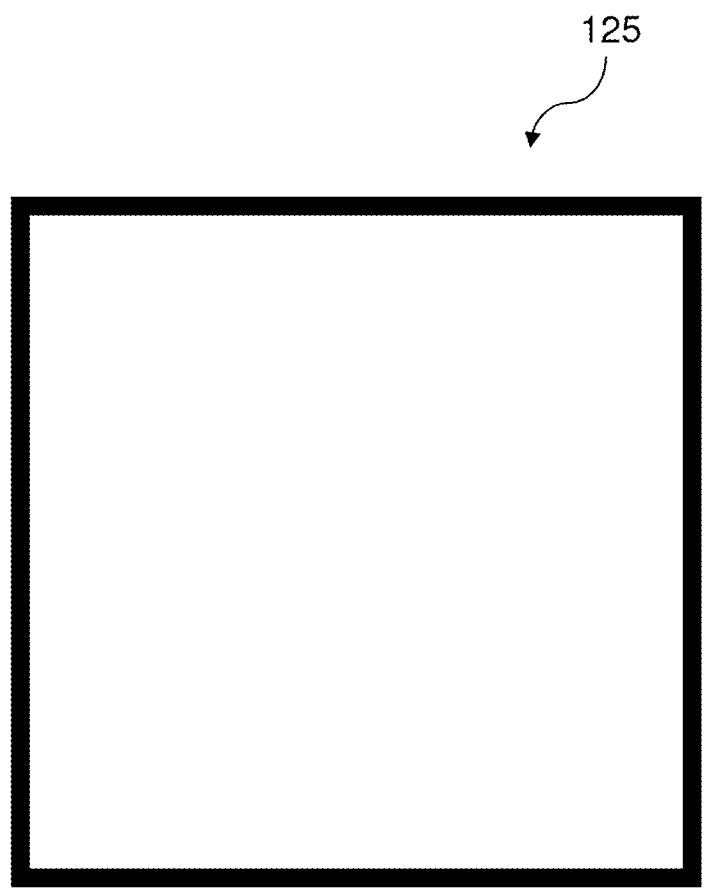
Figure 4:
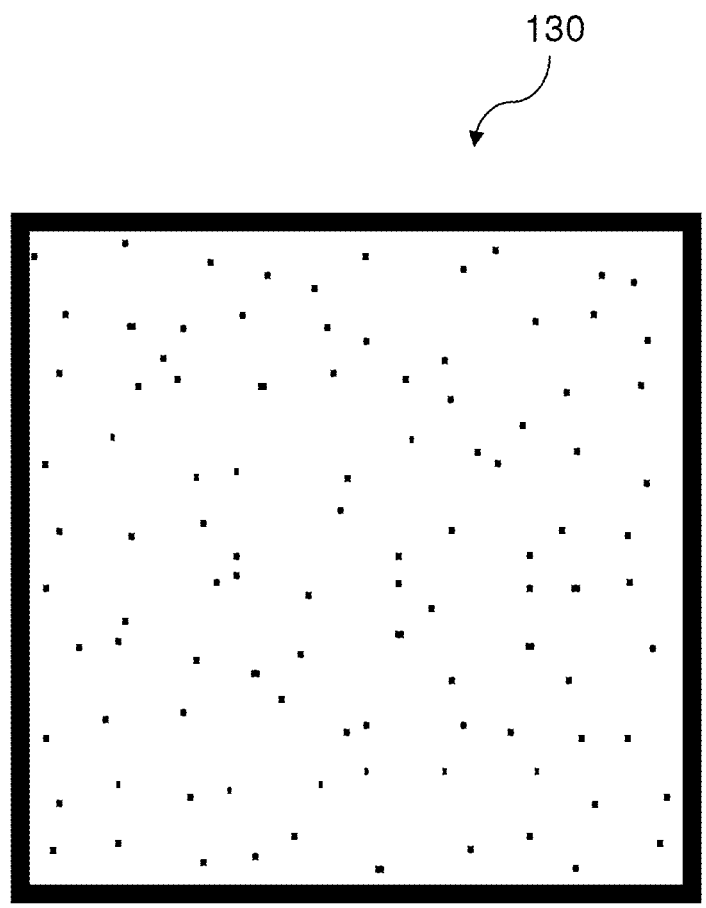
Figure 5:
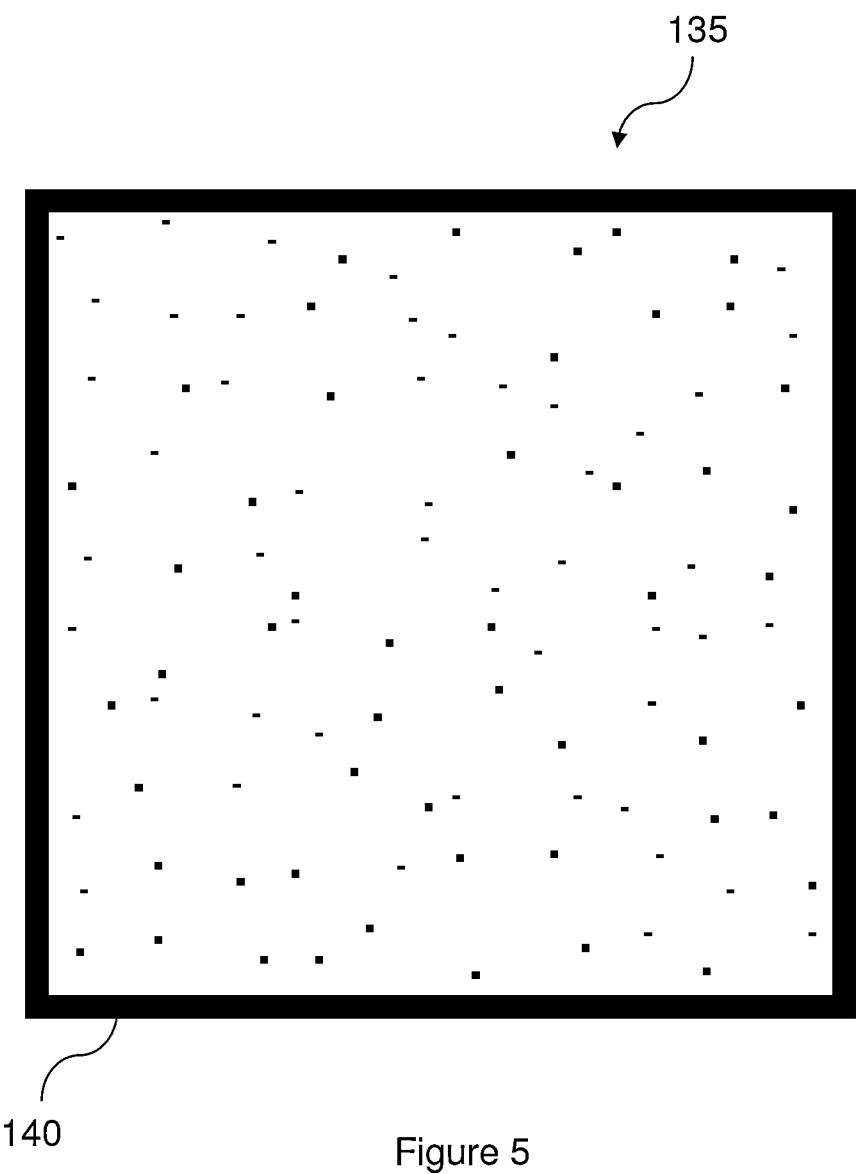
Figure 6:
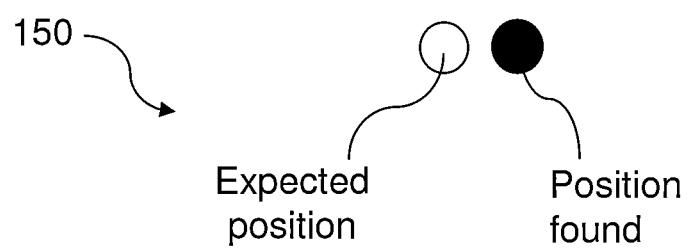
Figure 7:
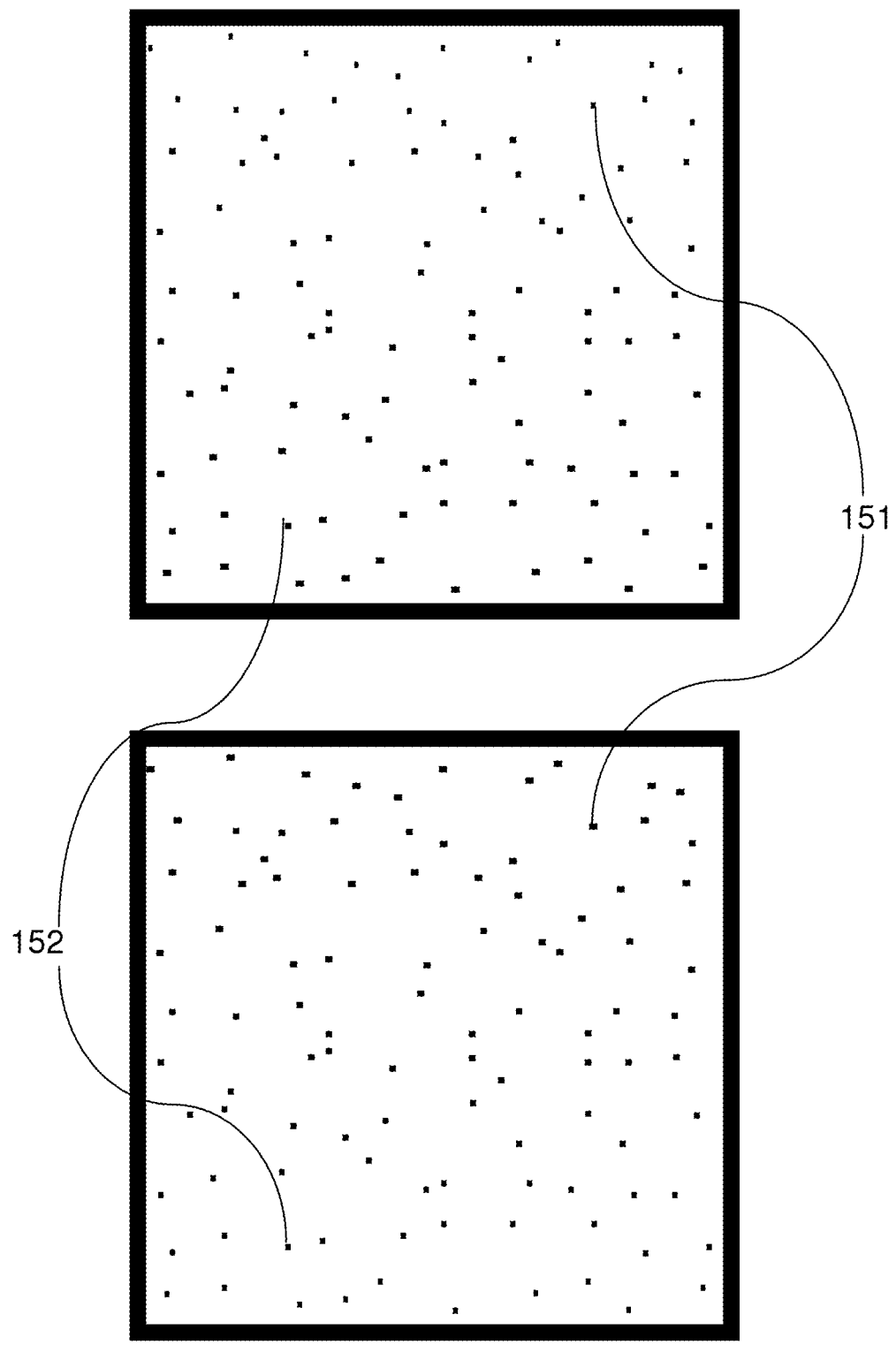
Figure 8:
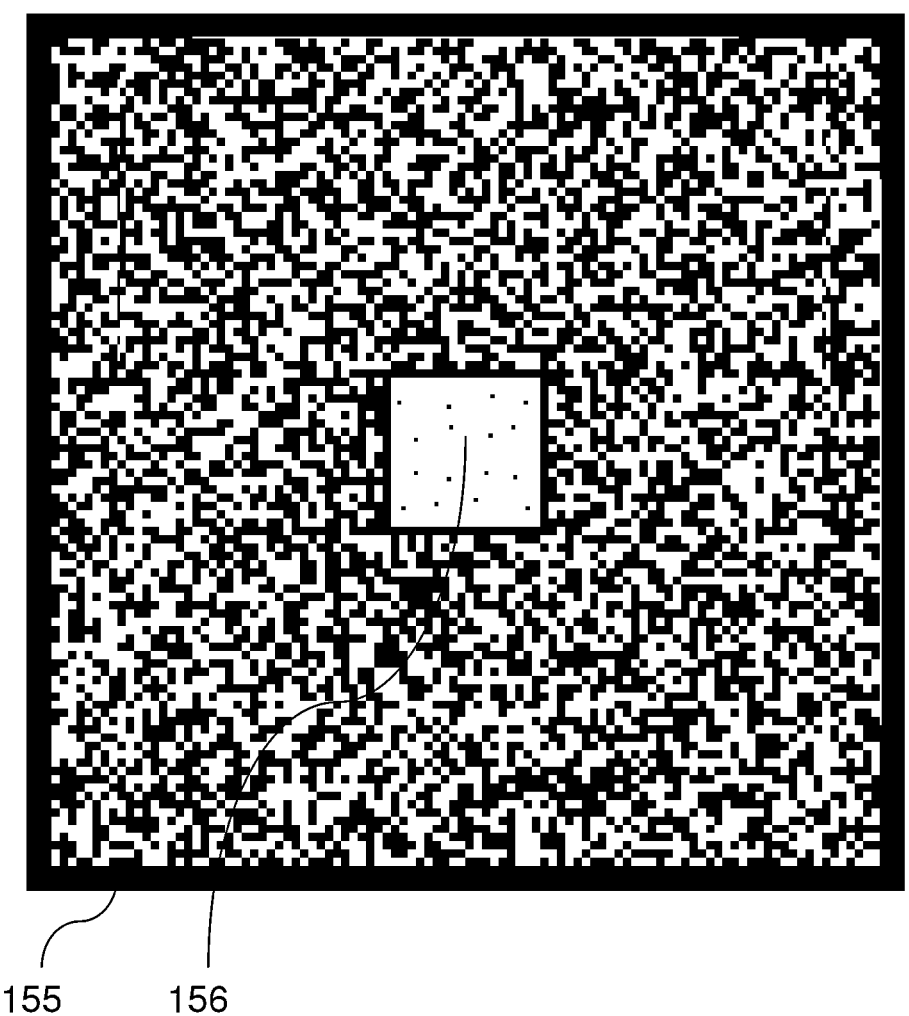
Figure 9:
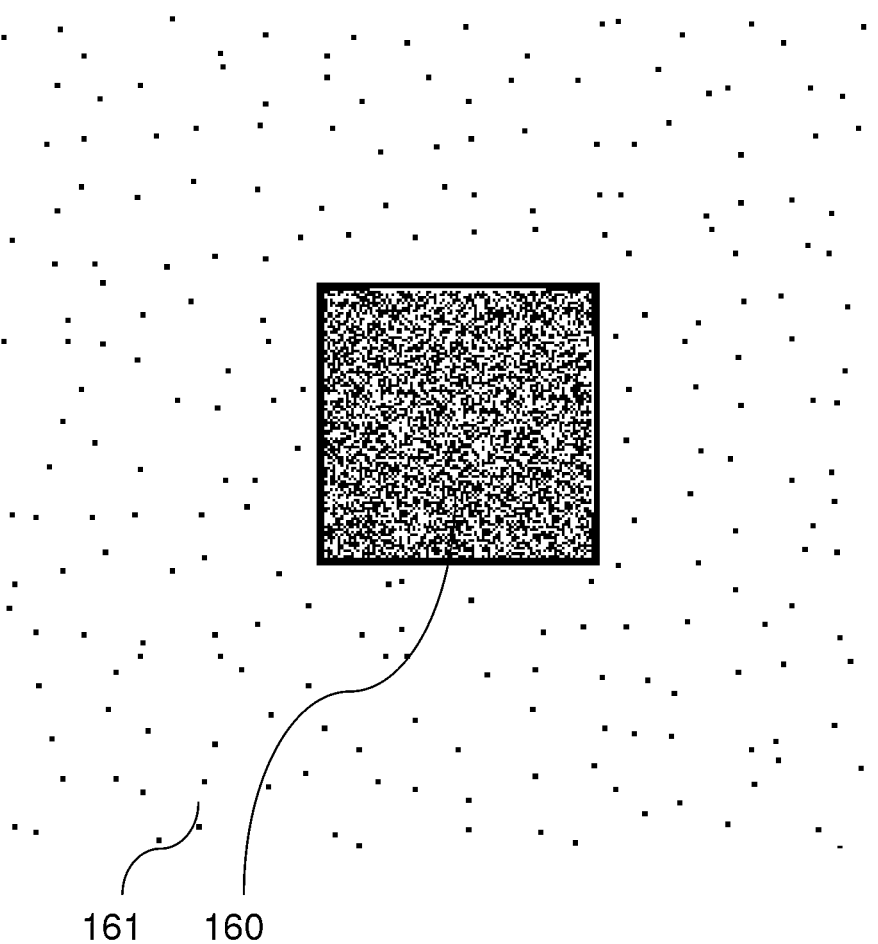
Figure 10:
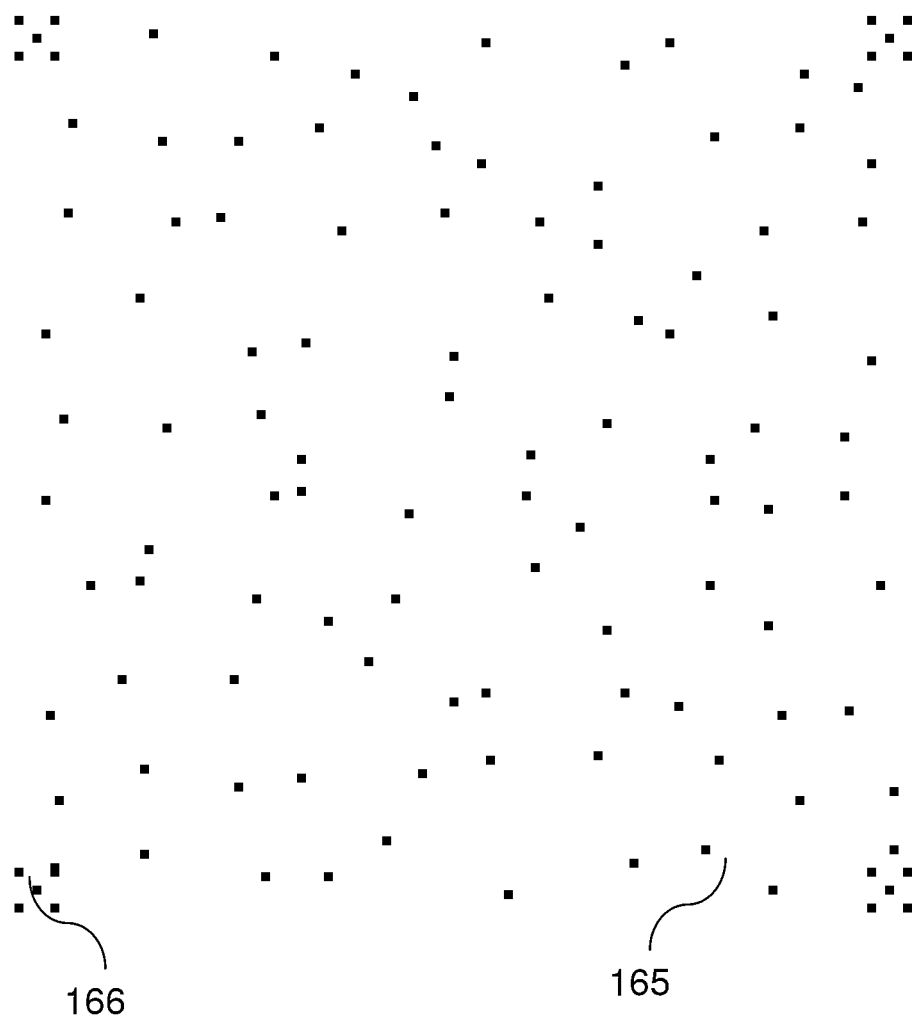
Figure 11:
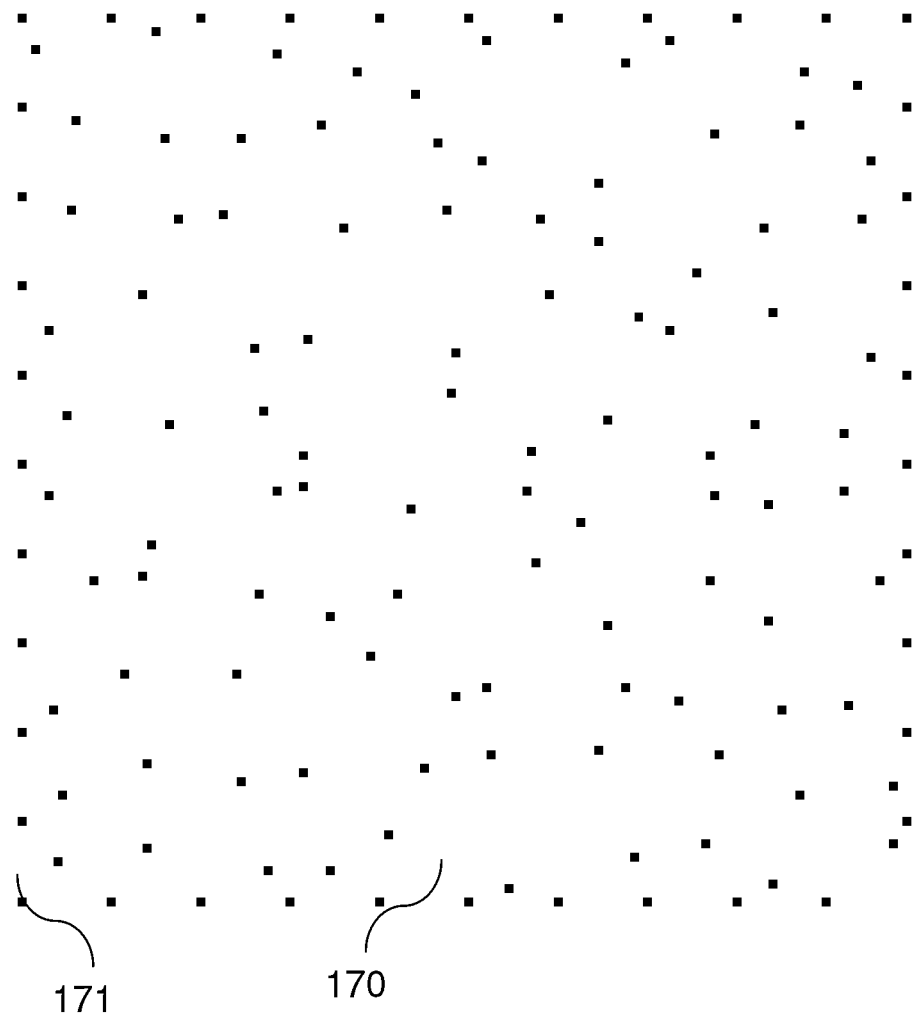
Figure 12:
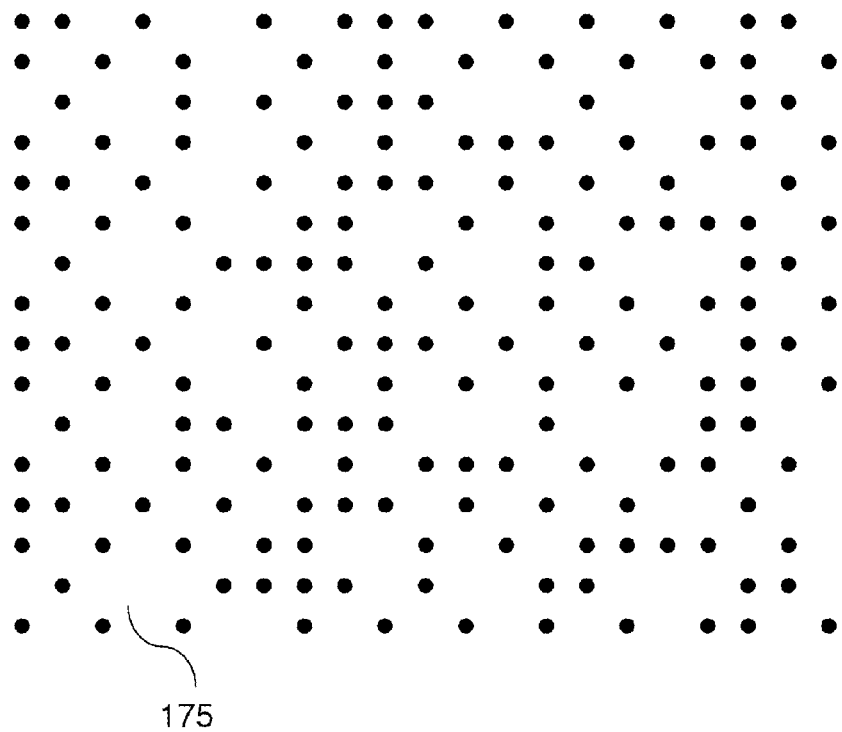
Figure 13:
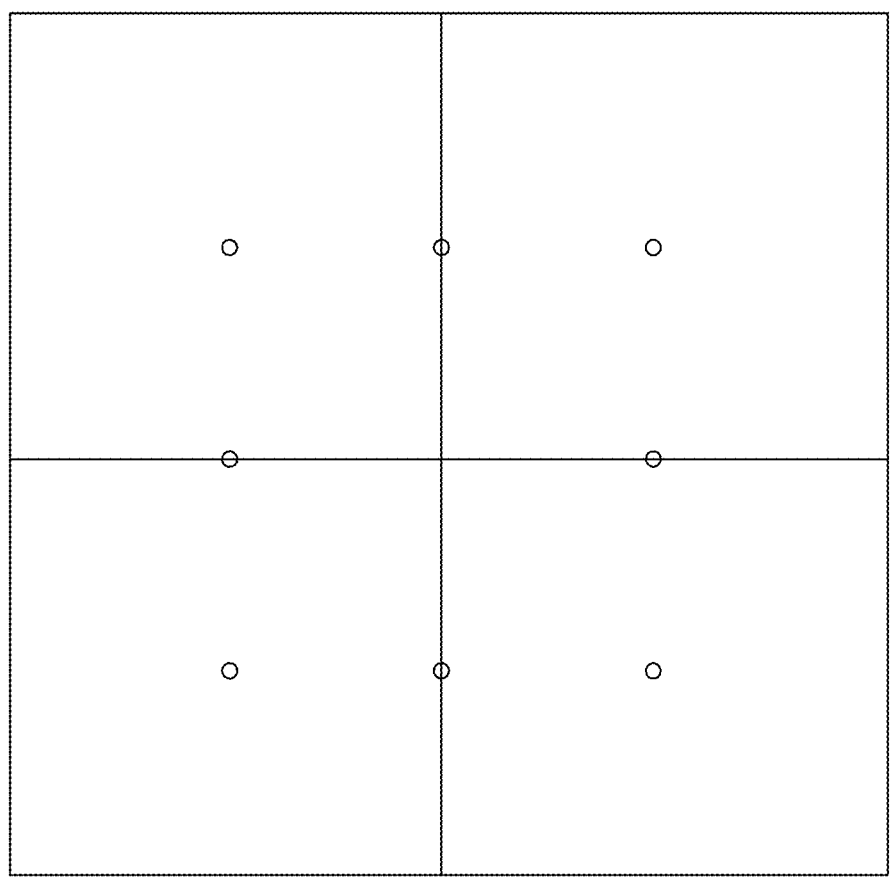
Figure 14:
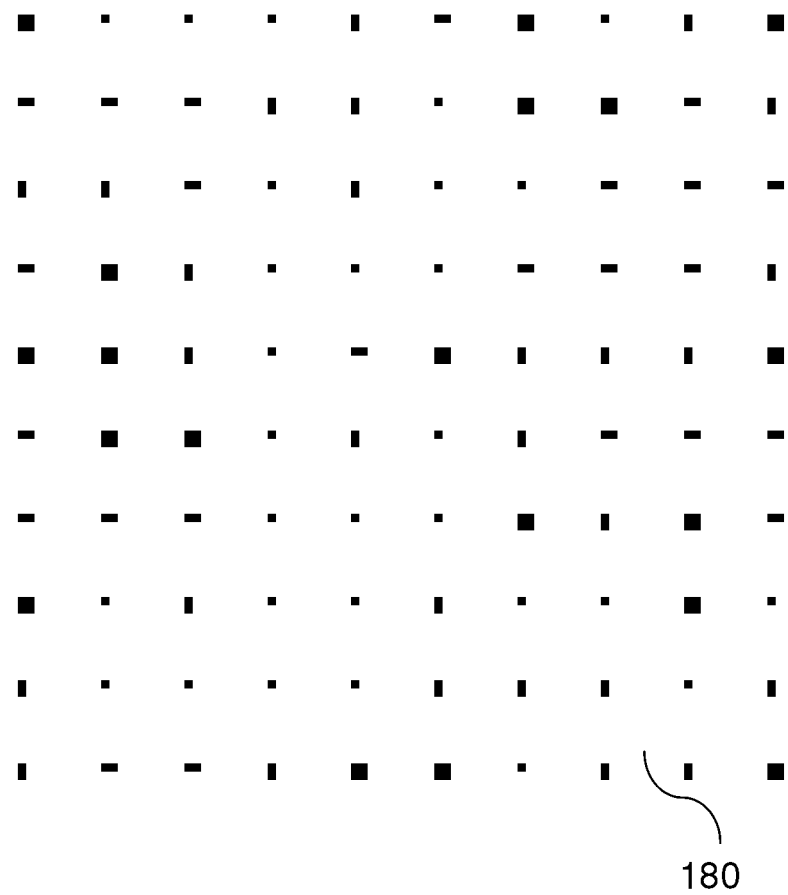
Figure 15:
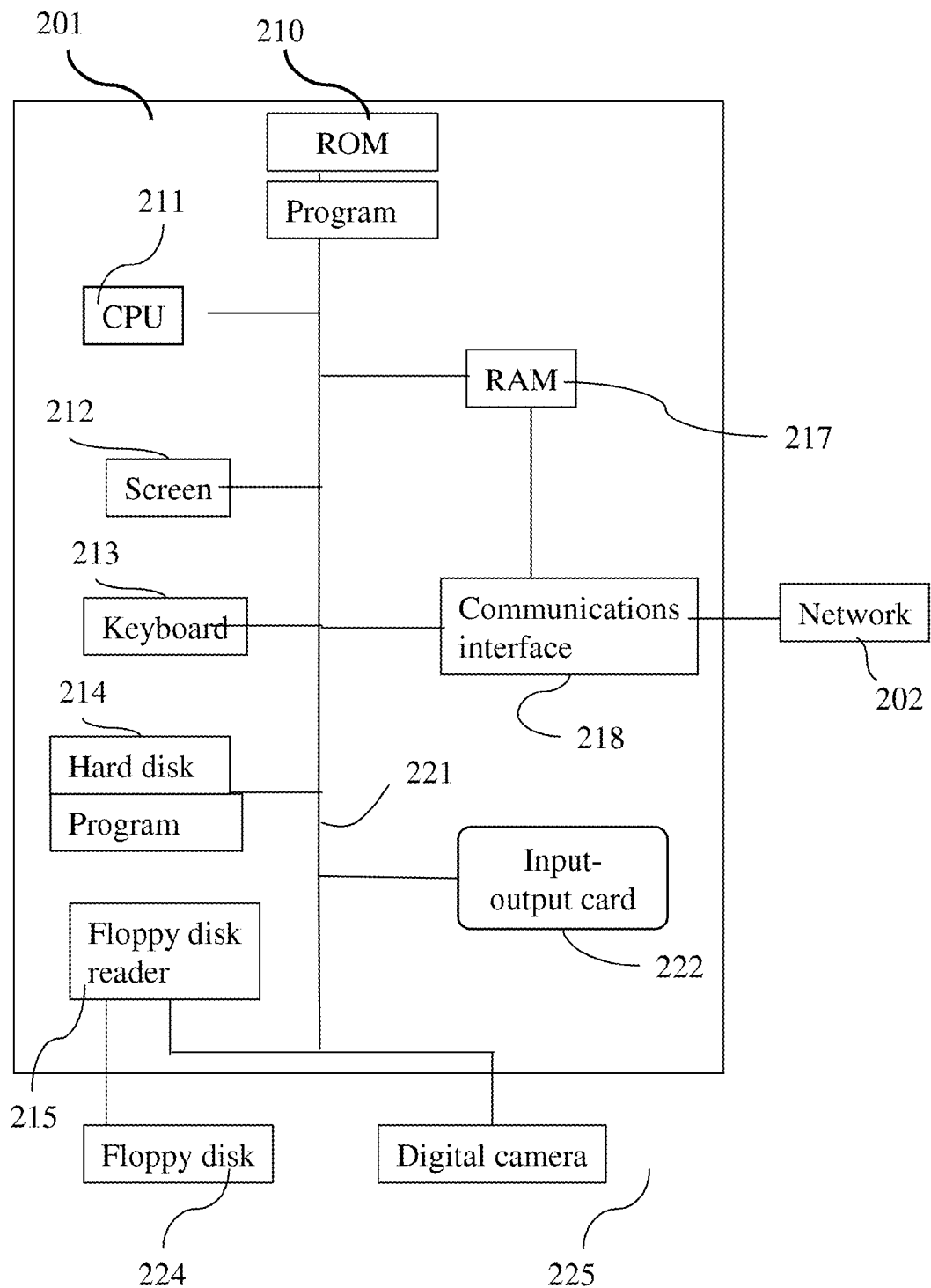
Figure 21:
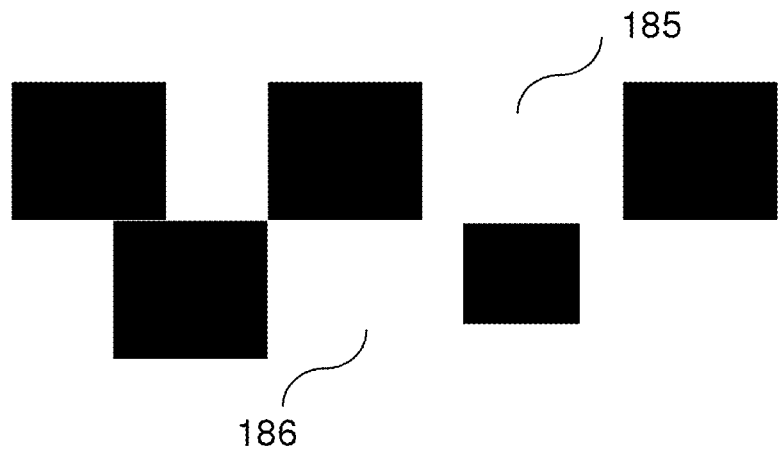
Figure 22:
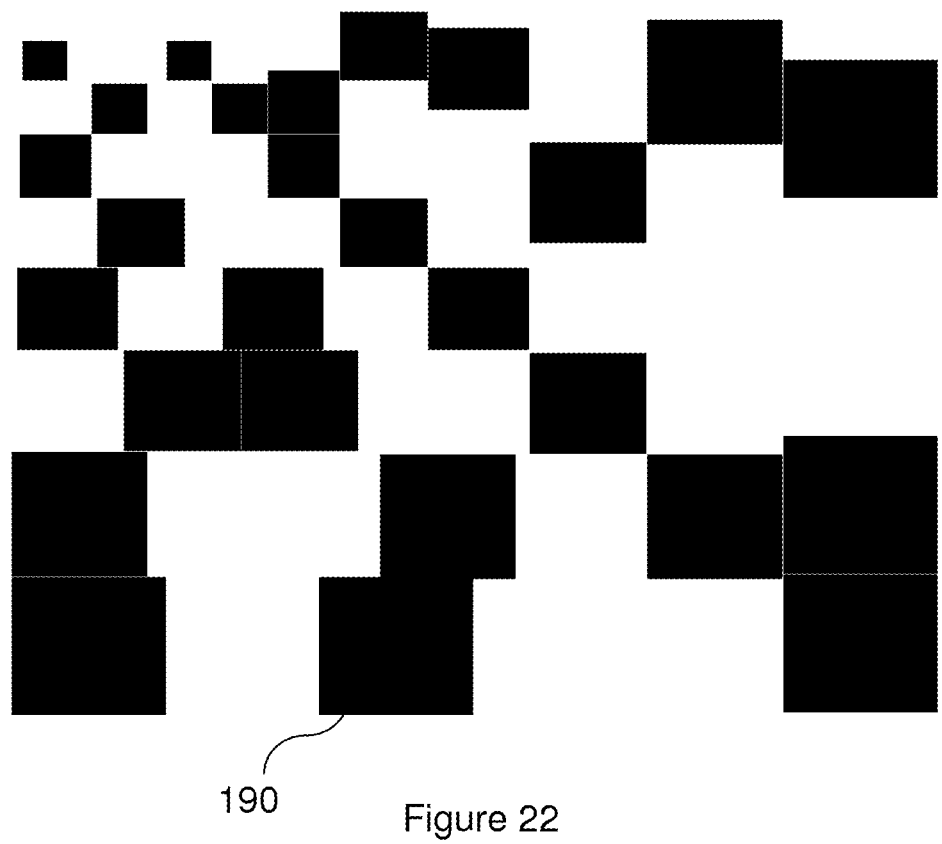
Figure 23:
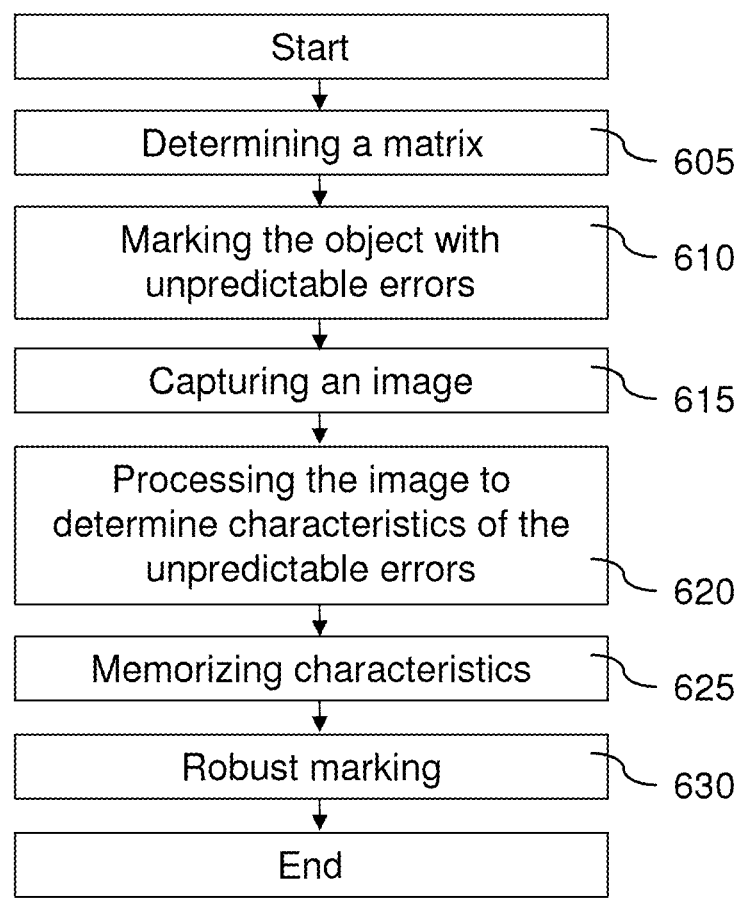
Figure 24:
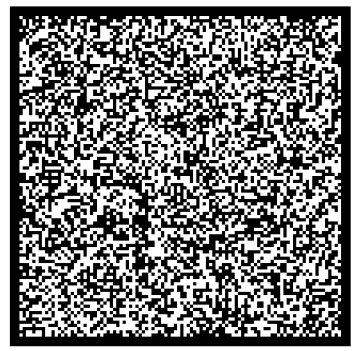
Figure 25:
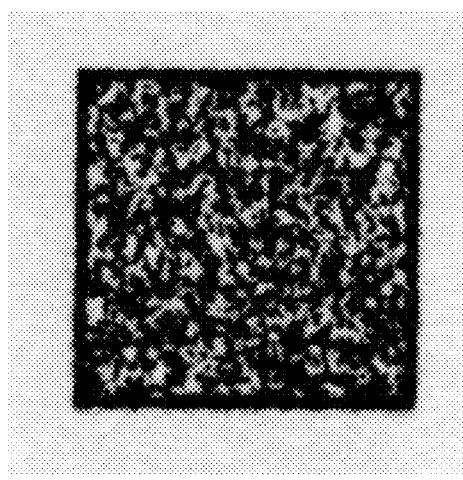
Figure 26:
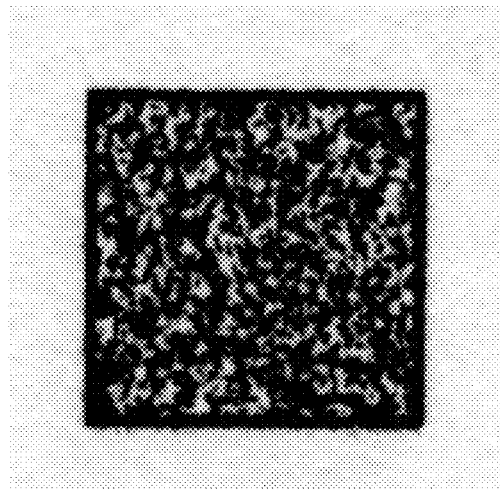
Figure 27:
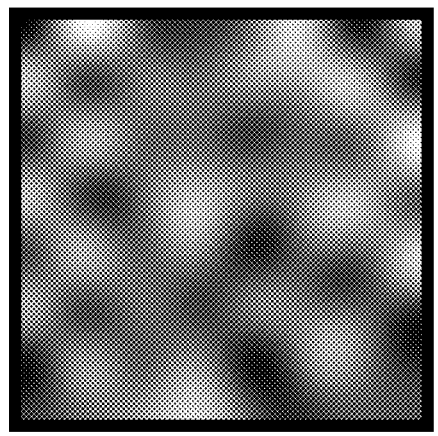
Figure 28A:
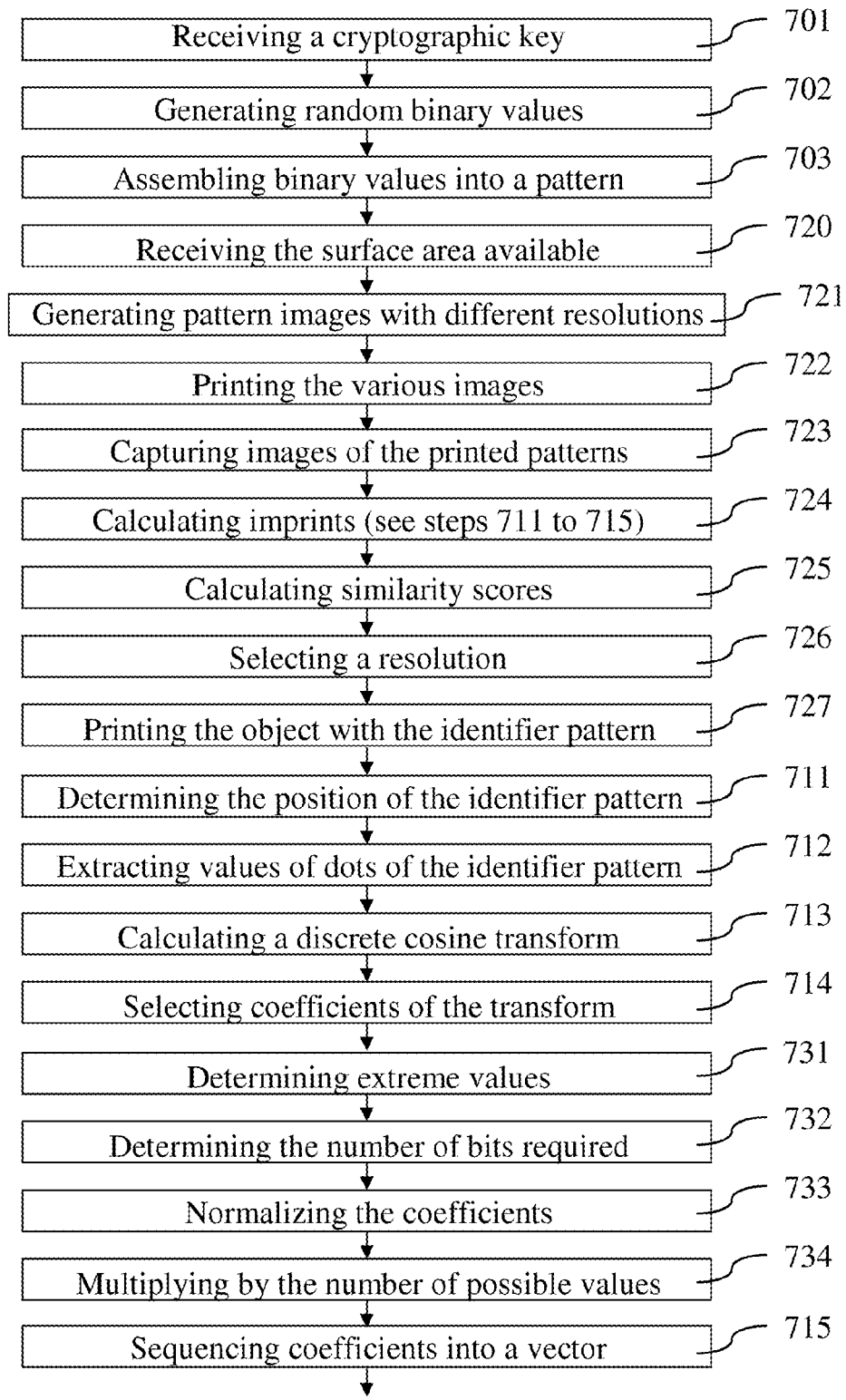
Figure 28B:
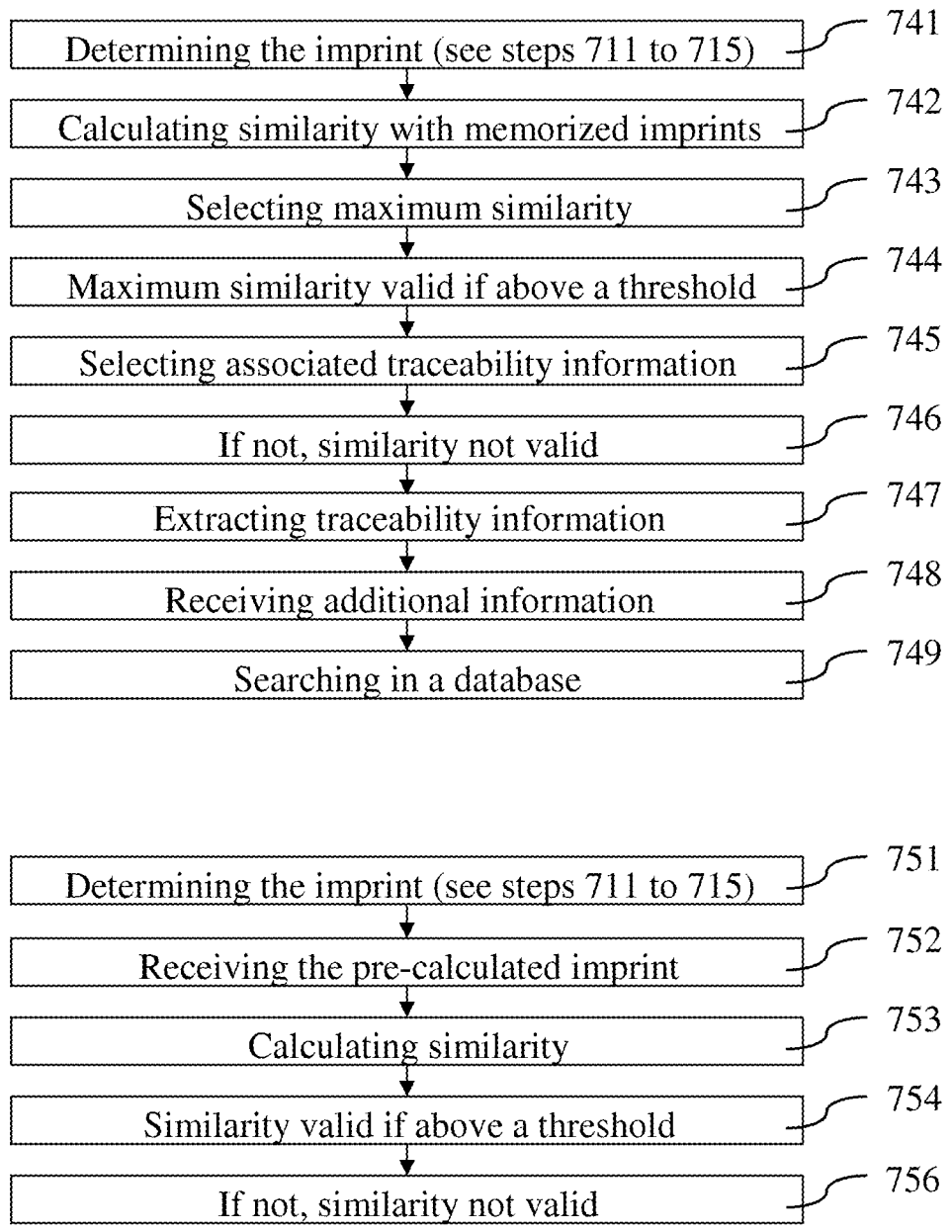
Figure 28C:
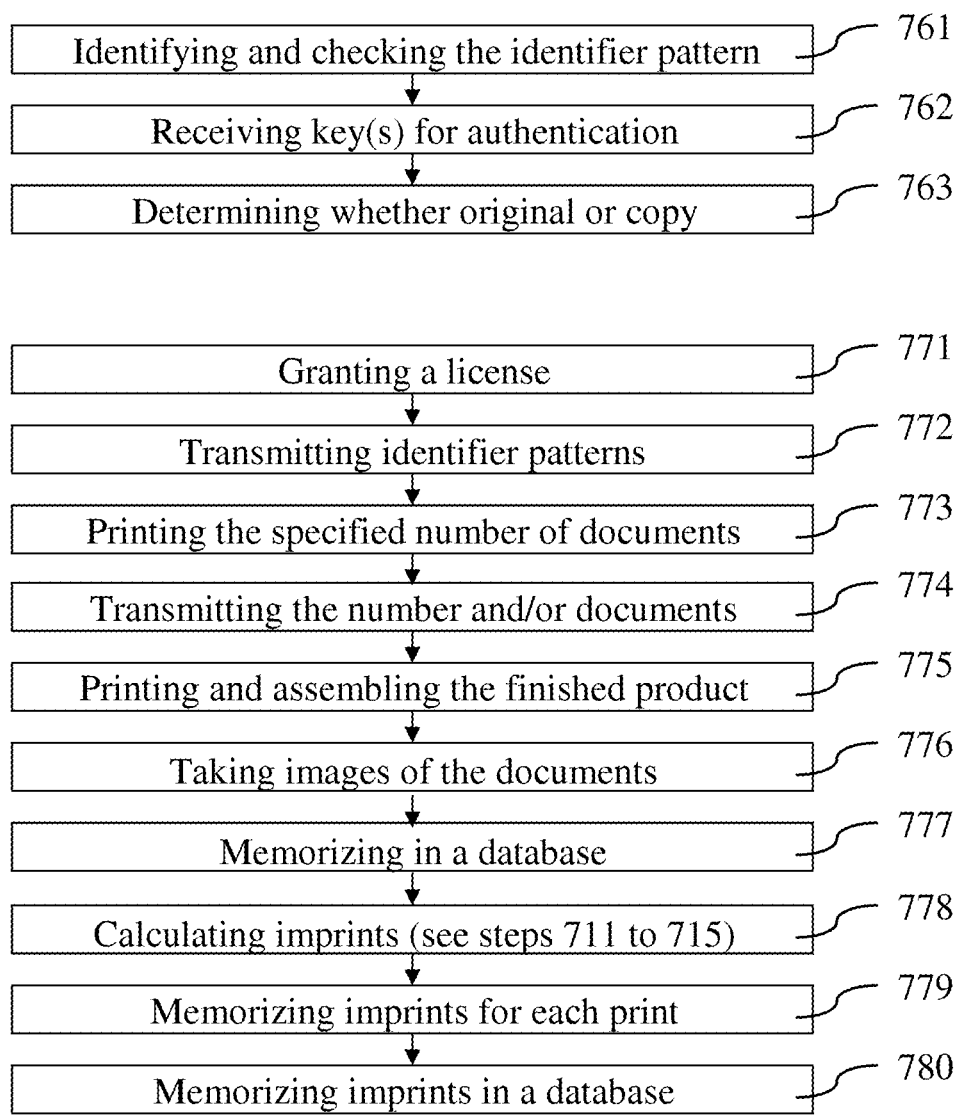
Figure 29:
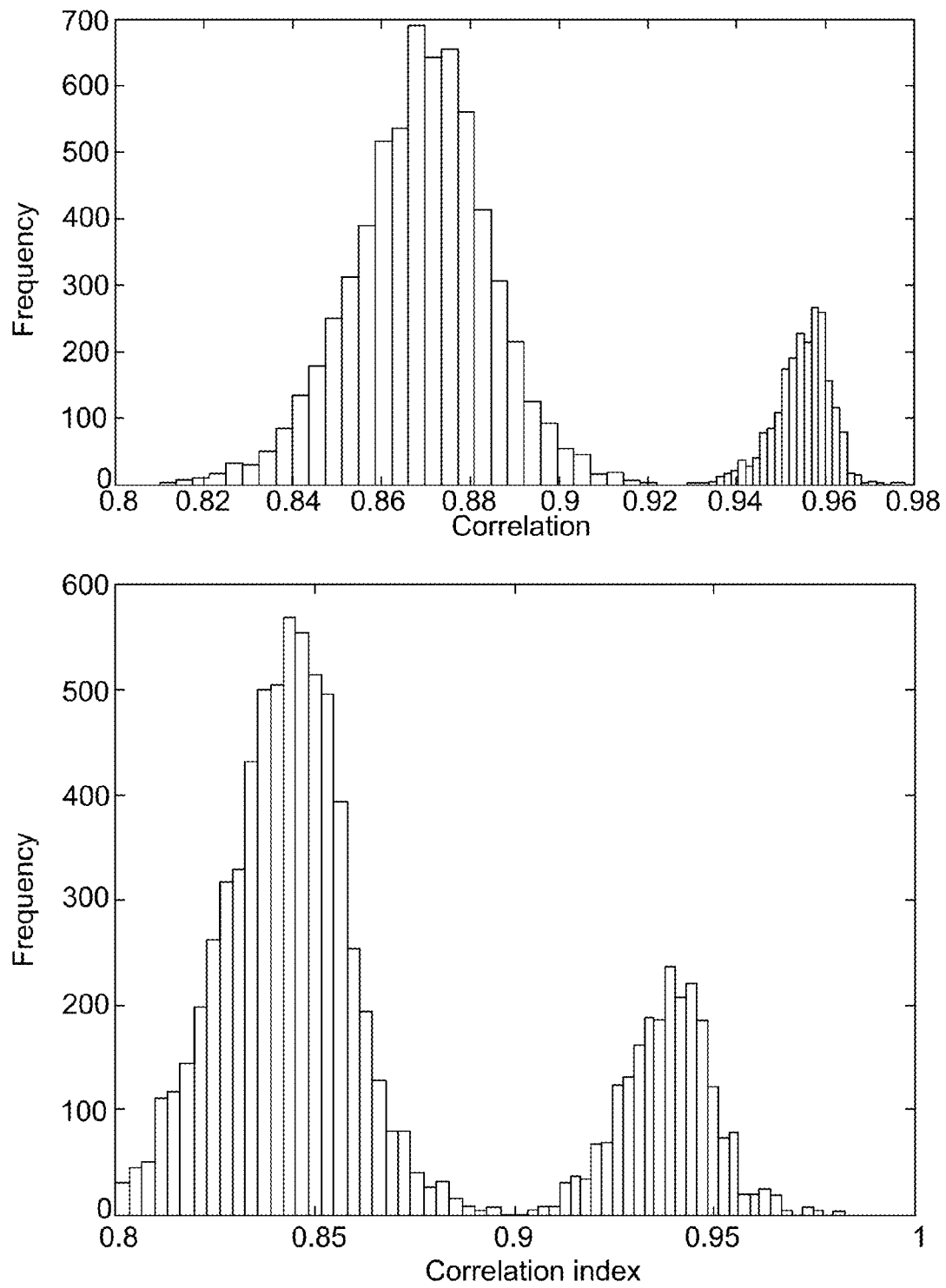
Figure 30:
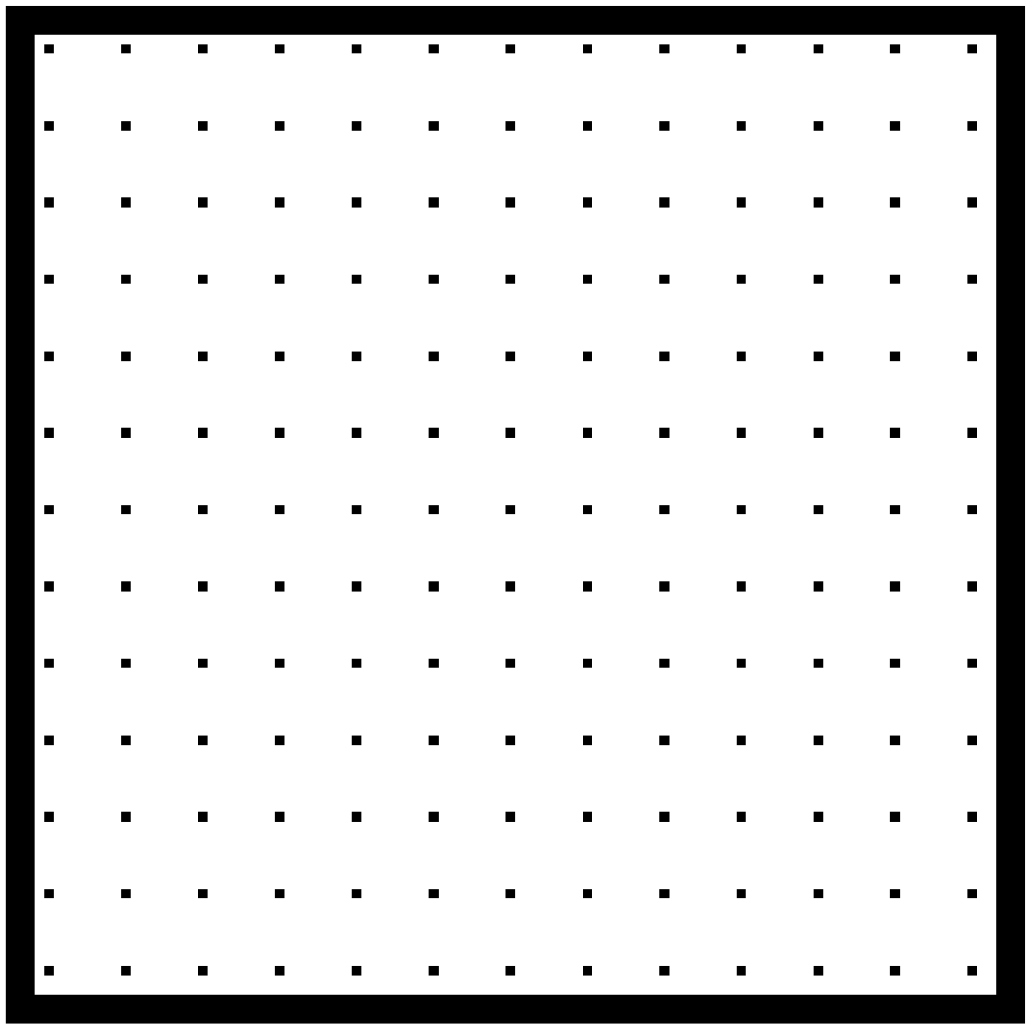
Figure 31:
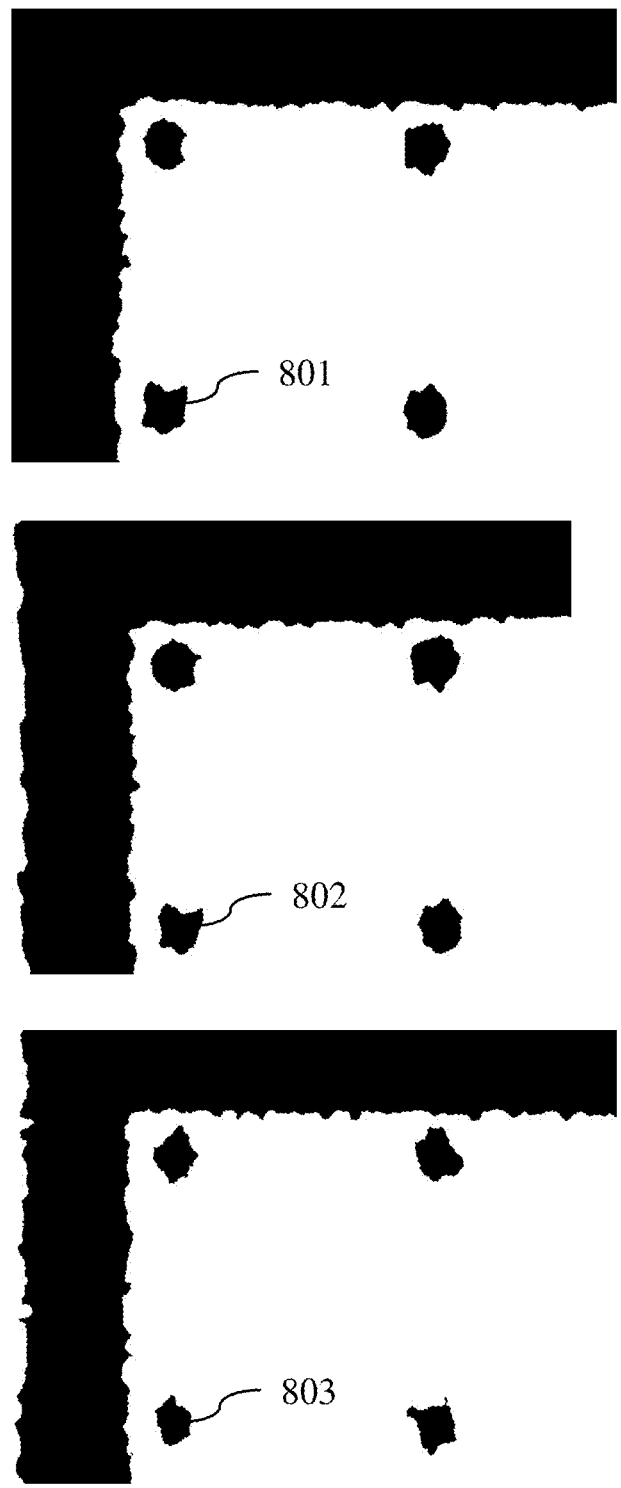
Figure 32:
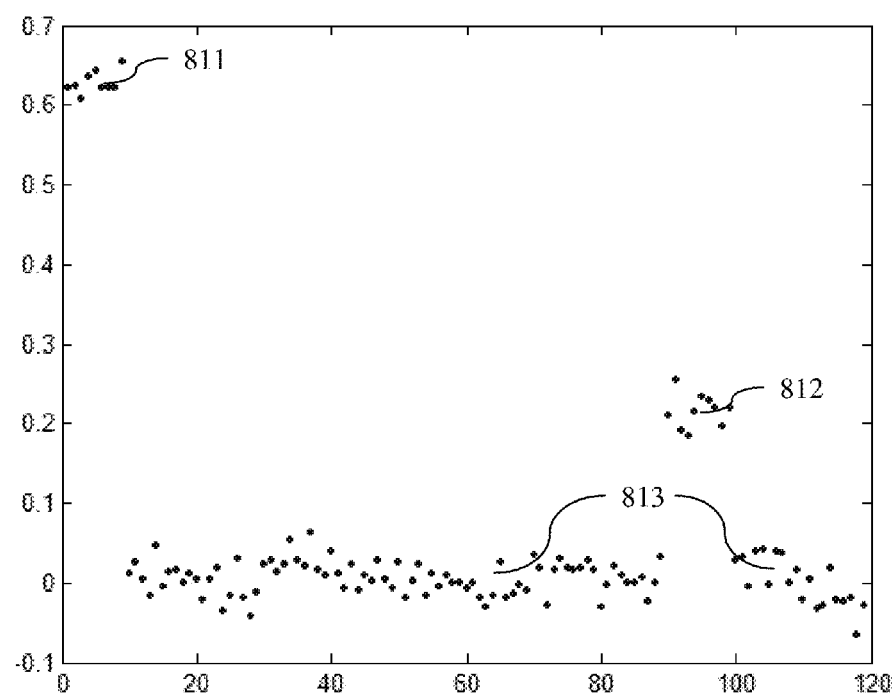
Figure 33:
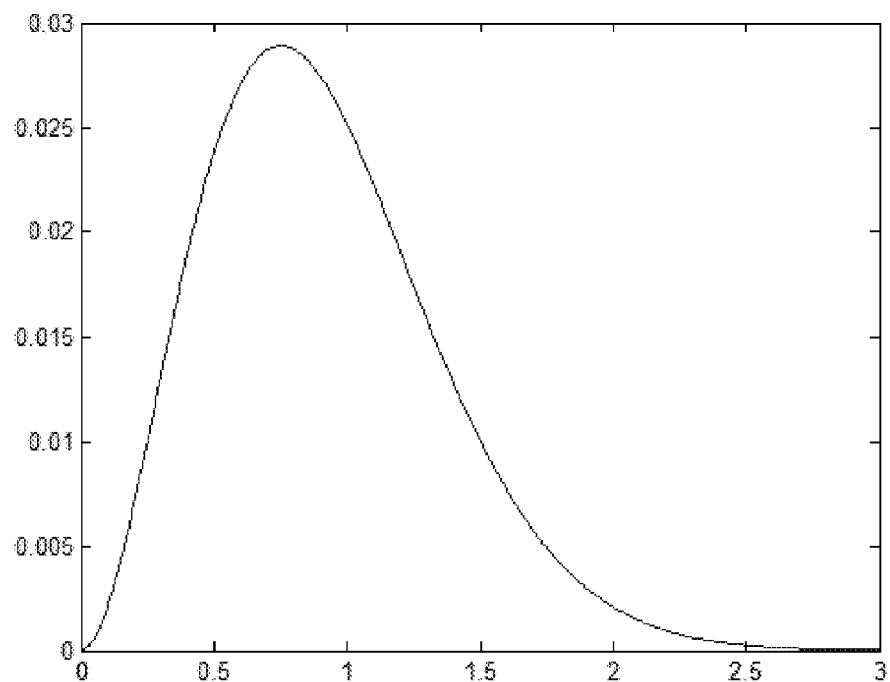
Figure 34:
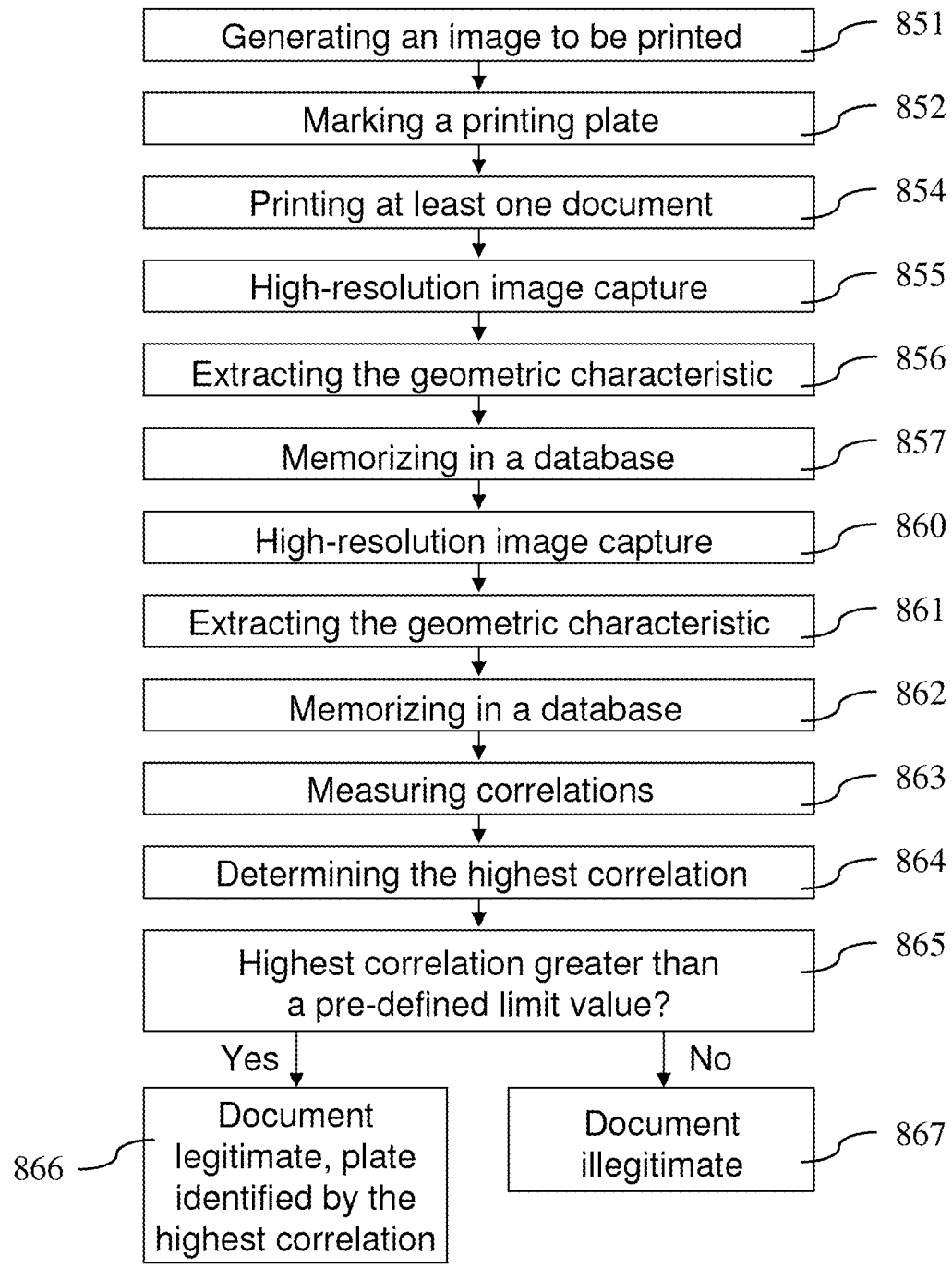

Other advantages, aims and characteristics of this invention will become apparent from the description that will follow, made, as an example that is in no way limiting, with reference to the drawings included in an appendix, in which:

FIG. 1 represents a digital mark enlarged by a factor of about 20,

FIG. 2 represents the mark illustrated in FIG. 1, after printing, enlarged, FIG. 3 represents a photocopy of the printed mark illustrated in FIG. 2, enlarged, FIG. 4 shows a high-quality copy of the printed mark illustrated in FIG. 2, enlarged, FIG. 5 represents, enlarged, a VCDP, the variable characteristic being, in this case, a dot height, FIG. 6 represents an enlargement, by a factor of about 200, of a part of a VCDP of FIG. 5, once printed, FIG. 7 shows two enlarged prints of a single VCDP having a constant dot size before printing, FIG. 8 represents, enlarged, a secured information matrix comprising, in its center, a VCDP, FIG. 9 represents, enlarged, a secured information matrix that is surrounded by a VCDP, FIG. 10 represents, enlarged, a VCDP the four corners of which consist of a dot surrounded by four dots that are close, FIG. 11 represents, enlarged, a VCDP with lines of dots on the four sides, FIG. 12 represents, enlarged, a part of a VCDP in the form of a grid, FIG. 13 represents the absolute value of the two-dimensional Fourier transform of the VCDP shown in FIG. 12, FIG. 14 represents, enlarged, a detail of a VCDP representing coded information, FIG. 15 represents, schematically, a particular embodiment of the device that is the subject of this invention, FIGS. 16A to 20 represent, in the form of a flowchart, steps utilized in particular embodiments of the various aspects of the process that is the subject of this invention, FIG. 21 represents an enlarged part of a high-density VCDP, FIG. 22 represents an enlarged part of a dot dimension gradient VCDP, FIG. 23 represents, in the form of a flowchart, steps utilized in a particular embodiment of the process that is the subject of this invention, FIG. 24 represents, in an enlarged view, a digital identifier pattern utilized in particular embodiments of the process that is the subject of this invention, FIG. 25 represents, in an enlarged view, the digital identifier pattern of FIG. 24, once printed on an object, in a first print of a series, FIG. 26 represents, in an enlarged view, the digital identifier pattern of FIG. 24, once printed on an object, in a second print of a series, FIG. 27 represents a discrete cosine transform of an image captured from one of the printed identifier patterns represented in FIGS. 25 and 26, FIGS. 28A to 28C represent, in the form of a flowchart, steps utilized in particular embodiments of the process that is the subject of this invention, FIG. 29 represents a distribution of the scores for two groups of identifier patterns utilized in particular embodiments of the process that is the subject of this invention, FIG. 30 represents a dot distribution to be printed, FIG. 31 represents an enlarged print image of the top left-hand portion of prints of the dot distributions illustrated in FIG. 30, FIG. 32 represents scatter diagrams of correlation measurements of dot shapes for the dot distribution illustrated in FIG. 30, FIG. 33 illustrates a graph obtained during the determination of an optimum error rate to be obtained on printing and FIG. 34 illustrates, in the form of a flowchart, steps utilized in a process determining the plate used for printing a document.

Before giving the details of the various particular embodiments of this invention, the definitions that will be used in the description are given below.

"information matrix": this is a machine-readable physical representation of a message, generally affixed on a solid surface (unlike watermarks or digital watermarks, which modify the values of the pixels of a design to be printed).

The information matrix definition encompasses, for example, 2D bar codes, one-dimensional bar codes and other less intrusive means for representing information, such as "Dataglyphs" (data marking);

"document": this is any (physical) object whatsoever bearing an information matrix;

"marking" or "printing": any process by which you go from a digital image (including an information matrix, a document, etc) to its representation in the real world, this representation generally being made on a surface: this includes, in a non-exclusive way, ink-jet, laser, offset and thermal printing, and also embossing, laser engraving and hologram generation. More complex processes are also included, such as molding, in which the digital image is first engraved in the mold, then molded in each object. Note that a "molded" image can be considered to have three dimensions in the physical world even if its digital representation comprises two dimensions. It is also noted that several of the processes mentioned include several transformations, for example standard offset printing (unlike "computer-to-plate" offset), including the creation of a film, said film serving to create a plate, said plate being used in printing. Other processes also allow information to be printed in the non-visible domain, either by using frequencies outside the visible spectrum, or by inscribing the information inside the surface, etc.

"Identifier pattern" or "IP": an image printed from a (digital) source image, designed and printed so that each of said source image's prints can be identified with high probability.

"Unique characteristics": the unique physical attributes of an identifier pattern, allowing it to be distinguished from any other print from the same source image.

"Imprint": all the values of the characteristics measured, allowing an identifier pattern to be represented and compared to other identifier pattern representations.

"Capture": any process by which a digital representation of the real world is obtained, including the digital representation of a physical document containing an information matrix, "Cell": this is a regular area, generally rectangular or even square, of a variable characteristic dot pattern ("VCDP") in which there is, at most, a pre-defined number of dots, the pre-defined number generally being equal to one, ecept in indicated variants;

"Generation pixel": the smallest area considered for generating a VCDP,

"Dot": a printed elementary area of very small size, possibly variable, making a contrast with a background, the dot generally being the representation of one or more generation pixels, "Capture pixel" or "image pixel": an area, the image of which corresponds to a photosensitive elementary dot, or pixel, of an image sensor, "Order of magnitude": a physical magnitude A is of the same order of magnitude as a physical magnitude B if the value of A is between one tenth and ten times the value of B and, for preference, between a half and two times.

In the embodiments of this invention described below with regard to FIGS. 24 to 29, the following are utilized:

steps 701 to 703, digitally designing identifier patterns, steps 711 to 715, calculating the identifier pattern's imprint (according to one of the methods described elsewhere), steps 720 to 726, optimizing the printing of identifier patterns, steps 731 to 734, storing and representing the imprints or unique characteristics of documents, steps 741 to 749, identifying the imprint by utilizing a database, steps 751 to 756, checking the imprint without a database, steps 761 to 763, the combined use of an identifier pattern and a digital authentication code, and steps 771 to 780, securing a document.

With respect to digitally designing an identifier pattern and determining an identifier pattern's print parameters, at the origin of certain particular characteristics of this invention, it has been discovered that, if you print a single source image of a secured information matrix several times, this will be affected with different errors on each print. The same effect has also been noted for copy detection patterns. More generally, it has been noted that, for any image having a sufficient density, 1) printing the image will result in its degradation, and 2) this will be affected by a different degradation with each print.

To be more precise, this phenomenon is not limited to digital authentication codes. In effect, whatever the density of a digital image, each of its prints will differ from all the other prints, given the random processes utilized in printing. Solely, for low-density images, the differences will be much less numerous and significant. Therefore a much higher capture resolution is needed in order to capture the differences, which are sometimes minimal. In contrast, for digital authentication codes printed with adequate resolution, you do not need to use a particularly high capture resolution (a 1200 dots per inch scanner is shown to be sufficient). In addition, as the differences are very significant, the extraction of the unique characteristics does not have to be done with very great precision, which is advantageous in terms of the cost and stability of the reading algorithms.

The identifier patterns are images designed and printed so as to maximize the differences between each print of a single source identifier pattern. For preference these images are designed in a pseudo-random way (for example with one or more cryptographic keys), but they can be completely random (the difference being that, in the second case, there is no cryptographic key or the key is not kept). However, it is noted that the original digital identifier pattern can be known without compromising security, in theory: in effect, only the identifier patterns recorded (with their imprint) in the database are legitimate, and in theory it is not possible to control the unanticipated unknowns in printing. Therefore, possession of the original image does not give the counterfeiter any real benefit, which is another advantage, in terms of security, of identifier patterns.

Since the degradations are random in nature and produce a different result for each print of a single source image, each print of an identifier pattern has unique characteristics that cannot be reproduced or transferred. Thus, each of the prints of a single identifier pattern is different from all the others, and therefore per se has the means for identifying it unequivocally. An identifier pattern's imprint can therefore be calculated and used in different ways in order to increase the security of the document that contains it, especially in identification and check modes.

The identifier patterns can be simple rectangles, possibly enclosed by a border making their detection easier, but can also have a special shape, such as a logo, etc. However, the rectangular shape is shown to have advantages with regard to reading (it can be easily identified) and its compatibility with the normal shapes of digital authentication codes or other codes such as one- or two-dimensional bar codes.

An algorithm for designing an identifier pattern is described below:

during a step 701, a cryptographic key is received, for example a 32-byte (256 bits) sequence, during a step 702, by using a recursive encryption or hashing function, the algorithm being initialized with the cryptographic key, the required number of random bits are generated. For example, for a 10,000-pixel black-and-white identifier pattern (1 bit per pixel), 10,000 bits are needed; 8 times more are needed for a grey-scale identifier pattern (each scale being equiprobable). Assuming that the SHA-1 hashing function is used (256-bit input and output), the function must be called 40 times (one bit per pixel) or slightly less than 320 times (eight bits per pixel) in order to obtain the necessary bits (since 40×256>=10,000 or 320×256>=80,000). The reader may draw on the FIPS (acronym for "Federal Information Processing Standard") and AES (acronym for "Advanced Encryption Standard") standards and during a step 703, the bits are assembled into an image, for example of 100×100 points, possibly completed by a border.

FIG. 24 shows such an identifier pattern, before printing. FIGS. 25 and 26 show two different prints of the identifier pattern shown in 24.

The functions of a digital authentication code can be combined with those of an identifier pattern, since the design and print characteristics of digital authentication codes are close to those required for the identifier patterns. For example, the design algorithms of the copy detection patterns, which require a cryptographic key, are similar to the algorithm described previously, even though the result sought is very different. As for the design algorithms of the secured information matrices, they require both one or more cryptographic keys and one or more messages. The result, however, is similar, i.e. an image with pseudo-random values.

As will be seen below, it turns out that the ideal print conditions for identifier patterns are close to the ideal print conditions for digital authentication codes. Thus it is possible, with respect to both the design and the printed result, to combine the functions of the digital authentication codes and those of the identifier patterns.

With regard to the methods of extracting and, when checking a document, of comparing the imprint of an identifier pattern, first of all a generic extraction and comparison method is described below, which consists of extracting the values of a set of dots of a captured identifier pattern:

during a step 711, the position of the identifier pattern in the image of the printed document is determined. For a rectangular-shaped identifier pattern, for example, the positions (height, width) of the four edges of the identifier pattern can be extracted.

during a step 712, for a given number of dots to be extracted, the position in the image is determined and the value of each of these dots is extracted. For example, 256 dots horizontally and 256 vertically, for a total of $256^2$, a number of dots corresponding to 2 raised to a whole power is advantageous if, for example, a FFT (fast Fourier transform) or a DCT (discrete cosine transform) is used later. The position of the dots can be determined by using standard geometric techniques, known from the prior art: determining the position of reference dots (for example, the four edges of the identifier pattern if this is rectangular), then determining the position of the dots by assuming that the captured image has undergone an affine or perspective transform, for example. The values are typically, for example, on a scale of 0 to 255, as well as the captured image. As the positions can be fractional, the value of the dot taken can be that "of the nearest neighbor", a method that is not very costly but not very precise. Interpolation algorithms, with a cost that increases with the required precision, can also be used: bicubic, bilinear, etc, interpolation. The result is a 256× 256 matrix of integer (nearest neighbor) or floating-point (interpolation) values.

during a step 713, the discrete cosine transform in two dimensions of the matrix is calculated. The discrete cosine transform is advantageous since it makes it possible to significantly compress the signal energy over a small number of components.

during a step 714, a given number of coefficients are selected, for example the 10×10 lowest frequency coefficients, and possibly eliminate the constant coefficient, known under the name "DC" coefficient at position (0,0)

during a step 715, the coefficients are re-sequenced into a vector, which constitutes the imprint of the secured information matrix.

It is noted that the method described above does not utilize any secret and, consequently, allows anyone whosoever to calculate the imprint. This can be desirable in certain cases, where it is not considered to pose a security risk. In contrast, in other cases it is desirable for only authorized people to be able to calculate the imprint. To do this, you use a cryptographic key that is kept secret and which makes it possible to determine the coefficients constituting the imprint. This key is only divulged to people or entities authorized to reconstitute the imprint. Techniques from the prior state of the art are available to people in this field for selecting the coefficients from the key, generally utilizing a hashing algorithm or an encryption algorithm.

Two imprints corresponding to separate captures can then be compared in multiple ways so as to obtain a measurement of similarity or, conversely, a measurement of distance. By measuring, for example, a coefficient of correlation between them, a measurement of similarity is obtained, which will be referred to as the "score" subsequently.

To validate this method of extracting unique characteristics, an identifier pattern of 100×100 pixels was generated that was printed 100 times on a 600 dots per inch laser printer. A 1200 dots per inch "flatbed" scanner was used to carry out three captures of each printed identifier pattern. An imprint was then calculated for each of the 300 captures done. A score is then measured for each of the 44,850 pairs of imprints (number calculated as follows: 300*(300−1)/2). These 44,850 imprint pairs are separated into two groups:

one group A of 600 pairs of imprints corresponding to different captures of the same printed identifier pattern and one group B of 44,250 pairs of imprints corresponding to captures of different printed identifier patterns.

The score is between 0.975 and 0.998 for group A, and between 0.693 and 0.945 for group B. FIG. 29 shows the distribution of the scores for group A and group B. On the basis of these scores, no confusion between the pairs of the two groups is possible. Thus, by using the imprint calculation method described above, you can determine without ambiguity which of the 100 prints is the source of the captured image.

An "imprint separation degree" is measured, which consists of calculating the difference of the averages of the scores for groups A and B (here 0.992 and 0.863 respectively) and normalizing it by the standard deviation of the scores of group A, here 0.005. A value of 25.8 is obtained. As will be seen later, this index is useful for determining the print and design parameters giving the best results.

A second method of extracting imprints concerning the secured information matrices is described below. This method applies in particular when the identifier pattern also has the functions of a secured information matrix. It explains how a captured secured information matrix's scrambled message is extracted. This scrambled message has a non-zero error rate and the structure of the errors is used as an imprint.

An advantage of this method is that it makes it possible to use software designed to read secured information matrices. This minimizes the cost of the calculations required.

However, the precise reading of a secured information matrix requires a key serving to generate the blocks to align, if necessary. You do not necessarily want to divulge this key in all cases. In addition, the internal alignment variations specific to each print are as far as possible eliminated. This is not necessarily desirable, since these variations play a part in differentiating the different prints of a secured information matrix.

With respect to the method of determining optimal parameters for generating and printing identifier patterns, an optimal level of degradation exists that enables the various prints of a single source identifier pattern to be separated as easily as possible. Thus, if the level of degradation on printing is very low, for example 1% or 2% (1 or 2% of the identifier pattern's cells or pixels are misread from a perfect capture), the various prints of a single identifier pattern are very close to each other and it is difficult to identify them reliably, unless you have a very precise capture and/or a very precise analysis algorithm. Similarly, when the level of degradation is very high, for example 45% or 50% (45 or 50% of the identifier pattern's cells or pixels are misread from a perfect capture, 50% signifying that there is no statistical correlation between the matrix read and the source matrix), the printed identifier patterns are almost indistinct from each other. In reality, the optimal level of degradation is close to 25%, and if the application conditions allow it, it is preferable to be close to this level. In effect, for 25% degradation, assuming that the print variations and therefore the degradations are by nature probabilistic, for each of the dots of the printed identifier pattern, the probability that it differs from the other printed identifier patterns is maximized.

A second analysis is given below of the error rates to be looked for when generating an image to be printed according to the printing means utilized.

In order to determine how VCDPs can be generated that enable the detection of copies to be optimized, we present a model below based on decision theory. The characteristics measured on the images (or dots) are represented by signals. In order to simplify the analysis, the hypothesis is made that the digital signals, before printing, have binary values, corresponding to characteristics that can have binary values (for example, two sizes of dots, two positions, etc). This hypothesis is justified by the fact that most print processes process binary images. Clearly, the conclusions of the analysis can be extended to more complex cases, especially with several possible values for dot characteristics. The printing of the VCDP is modeled by adding Gaussian noise. It is also assumed that the copies are made with the same print process, such that the printing of the copy is also modeled by adding Gaussian noise of the same energy. In addition, the counterfeiter, who captures the signal before printing a copy of it, is forced to reconstruct a binary signal by making an estimate of the initial value that minimizes their probability of error.

This model directly corresponds to VCDPs that can have dot sizes of 1×1 pixel or 1×2 pixels (printed, for example, at 2400 dpi), for which the counterfeiter must necessarily choose one of the dot sizes in the image reconstructed from a scan, according to a measured grey scale or an estimated surface area of the dot. The model also corresponds to VCDPs with positions varying by 1 pixel, for example.

From this model, we derive the optimal detector, the statistical distribution of the detector's values and the parameter values that maximize copy detection.

The following table summarizes the different variables.

| | |
|---|---|
| s | Source signal |
| n, $n_c$ | Noise, copy noise |
| X | Signal received |

Without losing generality, the source signal is equiprobable, i.e. $s[i]:\{+a,-a\}$, for $i=0, 1, \ldots, N-1$, and $a>0$. The print noise follows a Gaussian distribution $N(0,\sigma^2)$.

The hypotheses of the model are summarized thus:

$$(H0) x[i]:\{+a,-a\} \qquad (1)$$

$$(H1) n[i]:N(0,\sigma^2) \qquad (2)$$

$$(H2) n_c[i]:N(0,\sigma^2) \qquad (3)$$

You can easily check that counterfeiters minimize their probability of error by restoring the signal to the closest value between $+a,-a$.

Consequently, the detection problem consists of distinguishing the following two hypotheses:

$$H_0: x[i]=s[i]+n[i] \qquad (4)$$

$$H_1: x[i]=a.\text{sign}(s[i]+n[i])+n_c[i] \qquad (5)$$

where $H_0$ and $H_1$ are the hypotheses that the received signal is, respectively, an original and a copy.

The probability that the counterfeiter has correctly estimated the value is:

$$p(\text{sign}(s[i]+n[i])=s[i]=p(s[i]+n[i]>0) \qquad (6)$$

$$= p(N(a,\sigma^2)>0) \qquad (7)$$

$$= p(N(0,1)>-a/\sigma) \qquad (8)$$

$$= Q(-a/\sigma) \qquad (9)$$

where $Q(x)=(2\pi)^{-1/2}\int_{-a/\sigma}^{+\infty}\exp^{-x^2/2} dx$.

We have the following probability distributions for the signal received, where in the hypothesis $H_1$ we have a mixture of two Gaussian distributions.

$$p(x;H_0) = \frac{1}{(2\pi\sigma^2)^{N/2}}\exp\left[-\frac{1}{2\sigma^2}\sum_{n=0}^{N-1}(x[n]-s[n])^2\right] \qquad (10)$$

$$p(x;H_1) = (1-Q(-a/\sigma))\frac{1}{(2\pi\sigma^2)^{N/2}}\exp\left[-\frac{1}{2\sigma^2}\sum_{n=0}^{N-1}(x[n]+s[n])^2\right] + \qquad (11)$$

$$Q(-a/\sigma)\frac{1}{(2\pi\sigma^2)^{N/2}}\exp\left[-\frac{1}{2\sigma^2}\sum_{n=0}^{N-1}(x[n]-s[n])^2\right] \qquad (12)$$

We are going to check that a simple correlator gives an optimum classification function. A Neyman-Pearson detector test decides $H_1$ whether the likelihood ratio exceeds a threshold t:

$$L(x) = \frac{p(x;H_1)}{p(x;H_0)} > t \qquad (13)$$

The likelihood ratio is given by:

$$L(x) = Q(-a/\sigma) + (1-Q(-a/\sigma)) \qquad (14)$$

$$\exp\left[-\frac{1}{2\sigma^2}\left(\sum_{n=0}^{N-1}(x[n]+s[n])^2 + \frac{1}{2\sigma^2}\sum_{n=0}^{N-1}(x[n]-s[n])^2\right)\right]$$

Taking the logarithm, and a new threshold t', you obtain:

$$T'(x,s) = \sum_{n=0}^{N-1} x[n]s[n] < t' \qquad (15)$$

The classification function is therefore a simple correlator T', the value of which must be less than a threshold t' to classify the signal as a copy.

Let us determine the statistics of T' for both hypotheses. We can assume that T' follows a Gaussian distribution (true for N high), the means and variances of which we derive for both hypotheses:

$$E[T';H_0]=Na^2 \qquad (16)$$

$$E[T';H_1]=Q(-a/\sigma)Na^2-(1-Q(-a/\sigma))Na^2=(2Q(-a/\sigma)-1)Na^2 \qquad (17)$$

$$\text{Var}[T';H_0]=Na^2\sigma^2 \qquad (18)$$

$$\text{Var}[T';H_1]=N(a^2\sigma^2+a^4Q(-a/\sigma)(1-Q(-a/\sigma))) \qquad (19)$$

The second term of the variance for the hypothesis $H_1$, $(a^4Q(-a/\sigma)(1-Q(-a/\sigma)))$, can be eliminated if the copies come from the same original. In practice, as counterfeiters minimize their work by only using one original to produce a large number of copies, it is reasonable to eliminate the term.

In the case in which the variances are equal, the detection performance can be characterized by the deflection coefficient $d^2$, which corresponds to the difference between the means of function T' for the two hypotheses, normalized by the variance of T':

$$d^2 = \frac{(E[T';H_0]-E[T';H_1])^2}{\text{Var}[T';H_0]} \qquad (22)$$

$$= \frac{2N^2a^4(1-Q(-a/\sigma))^2}{Na^2\sigma^2} \qquad (23)$$

$$= \frac{2Na^2(1-Q(-a/\sigma))^2}{\sigma^2} \qquad (24)$$

$$= 2N(\gamma(1-Q(\gamma))^2 \qquad (25)$$

where $\gamma=a/\sigma$ is the square root of the signal to noise ratio.

Since the detection performance increases with the deflection coefficient, the objective is to determine the value of $\gamma$ maximizing the expression $(\gamma(1-Q(\gamma)))^2$.

FIG. 33 represents the value of the expression according to $\gamma$. It can be interpreted as follows. The values of $\gamma$ close to zero correspond to a very high noise with reference to the signal: when the noise is very high, the signal is too degraded on the first print, the counterfeiter introduces a number of estimation errors that is too low. Conversely, for values of γ that are too high, the signal is not sufficiently degraded, and in too large a proportion of cases the counterfeiter does not introduce any estimation error. Between these two extremes, the expression passes through an optimum value, for which the value is numerically estimated to be γ≈0.752.

It is interesting to note that, for this value, the probability that the counterfeiter has not correctly determined the value is approximately 22.6%.

In practice, it involves obtaining a signal to noise ratio $\gamma^2$ as close as possible to $0.752^2$, i.e. 0.565.

Let us take an example in order to better understand how to target this ratio value. Assume that we generate a VCDP with two possible dot sizes (expressed in number of pixels), the dot size being nine pixels (for example, 3×3 pixels). It is noted that the dot size can be measured by utilizing a large number of algorithms, for example by local adaptive thresholding for the grey scale and counting the pixels below the threshold. Dots of nine pixels are printed a sufficient number of times. In a captured image, the mean and standard deviation for each dot's number of pixels are measured. Assume that a mean of twelve is obtained (an average gain of 33% is observed), and a standard deviation of four. This standard deviation corresponds to the value σ describing the noise in the formulae for our model. A value of approximately three will therefore be aimed at for our signal a in order to obtain a ratio γ=0.75, which is very close to the optimum. In order to obtain this signal value you can, for example, define two dot sizes of fifteen and six pixels.

A possible algorithm for optimizing print parameters is described below:
  during a step 720, the surface area available for the identifier pattern is received, for example a square measuring ⅙ inch,
  during a step 721, several digital images of identifier patterns are generated with different digital sizes, corresponding to various possible print resolutions, for example one identifier pattern of 66×66 pixels at 400 dots per inch, one of 100×100 pixels at 600 dots per inch, one of 133×133 pixels at 800 dots per inch, one of 200×200 pixels at 1200 dots per inch,
  during a step 722, each one of the identifier patterns with different digital sizes is printed several times, for example 100 times, with suitable resolution so that the dimensions of the print correspond to the surface area available.
  during a step 723, for each type, each one of the printed identifier patterns is captured several times, for example 3 times,
  during a step 724, each identifier pattern's imprint is calculated,
  during a step 725, the similarity scores are calculated for all the pairs of captured identifier patterns with the same print resolution and
  during a step 726, the method described in the test of the generic imprint extraction method mentioned above is followed to measure the "imprint separation degree", for each of the print resolutions, and the print resolution giving the maximum value for this degree is selected.

In a variant, several secured information matrices are printed with different print resolutions, and the print resolution resulting in a 25% error rate, as calculated with one of the algorithms described elsewhere, is determined.

In a variant, the print resolution is selected for which the difference between the lowest value for the score calculated on comparing imprints corresponding to identical prints, and the highest value for the score calculated on comparing imprints corresponding to different prints, is the greatest.

With respect to the method of representing and storing characteristics, it is advantageous to reduce the imprint data volume as far as possible. In the case of identification, this involves comparing an imprint to a very large number of imprints stored in a database, which is very costly. This cost is reduced by reducing the size of the imprints to be compared, especially by avoiding using floating-point numbers.

Consider the case of the generic imprint extraction method. The initial data vector extracted from a captured identifier pattern is the 256×256 matrix of extracted values, and its representation by a discrete cosine transform, after selecting coefficients, has 10×10 values. It is advantageous to represent the matrix of values with one byte per value, i.e. 100 bytes.

During a step 727, at least one object is printed with an identifier pattern to produce a secured document.

On the other hand, the coefficients of the discrete cosine transform can be either positive or negative, and in theory are not limited. In order to represent such values with a fixed amount of information, the values must be quantified so as to be represented in binary values. A possible approach is as follows:
  during a step 731, a minimum value and a maximum value are determined, in advance, for each coefficient. In general, the minimum and maximum values have the same absolute value.
  during a step 732, the number of bits or bytes allowing each value to be represented is determined and
  during a normalization step 733, for each coefficient of the discrete cosine transform, the minimum value is subtracted and then the remainder is divided by the maximum value,
  during a step 734, the result is multiplied by the number of possible values of the quantified data, i.e. 256 if one byte is available for each value. The integer value of the result is compared to the original quantified value.

In a variant, the quantification steps are optimized so as to minimize the quantification error.

With respect to the method of identification with database, in the case of identification, an identifier pattern must be compared with each of a database's identifier patterns, in order to determine whether it corresponds to one of the database's identifier patterns, in which case the identifier pattern is considered to be valid, and the associated traceability information can be retrieved. If not, the identifier pattern is considered not valid.

In embodiments, the following steps are utilized:
  during a step 741, the imprint of the identifier pattern contained in the captured image is determined,
  during a step 742, the obtained imprint's score, or similarity, is calculated with each of the imprints stored in the database,
  during a step 743, the maximum similarity obtained is determined,
  during a step 744, if the maximum similarity is above a threshold value, the identifier pattern is deemed valid and, during a step 745, the associated traceability information is retrieved,
  if not, during a step 746, the identifier pattern is deemed not valid.
In variants:
  during a step 747, if the identifier pattern also has the functions of a digital authentication code, the traceability information is extracted.

during a step 748, the traceability information allowing the search space to be reduced can also come from another source, for example an associated bar code, information from the controller, etc and during a step 749, this information is used to reduce the search space in the database. For example, the manufacturing order information makes it possible to pre-select imprints to be compared from the sub-set of imprints corresponding to this manufacturing order.

With respect to the method of checking without database, this requires the pre-calculated imprint of the identifier pattern to be stored on the document. For example, during the step calculating the imprint of each of the legitimate documents, these can be destined both to be stored in a database and to be stored in a secured way on the document.

The storage of the imprint on the document is for preference done by variable printing, i.e. different for each document, on the fly. The imprint can be stored in a one- or two-dimensional bar code, or in a digital authentication code, depending on the print means, the quality of which can be limited.

It is generally preferable to store the imprint in a secured way, for example by using a cryptographic algorithm equipped with a secret encryption key. In this way you avoid the risk of a counterfeiter using non-legitimate documents without having to be connected to a reference database. The following steps are utilized for this:

during a step 751, the imprint of the identifier pattern contained in the captured image is determined, during a step 752, the pre-calculated imprint is received, during a step 753, a score, or a similarity, is calculated by comparing the imprint obtained with the pre-calculated imprint, during a step 754, if the maximum similarity is above a threshold value, the identifier pattern is deemed valid, if not, during a step 756, the identifier pattern is deemed invalid.

With respect to a combined use of an identifier pattern with the functions of a digital authentication code, the prior state of the art methods of uniquely characterizing documents use characteristics that cannot be interpreted without making use of a database. On the other hand, while the identifier patterns can simply be images with no significance, as has been seen, they can also be images comprising other functions. In particular they can be digital authentication codes, in which case they can comprise secured information (one or more keys are required to read them), and/or have authentication properties (to distinguish an original from a copy).

The identifier pattern's imprint can be designed to be sufficiently precise to identify the document, but not sufficiently to not be reproducible. In effect, consider the generic method of determining the imprint, based on 100 low-frequency DCT coefficients, possibly represented with one byte each. Any person whatsoever can, in theory, extract these coefficients, and create an image of the same dimension as an identifier pattern by inversing these coefficients. As is understood, this image is very different from printed identifier patterns. Nevertheless, the score obtained by comparing the imprint calculated from an inversed image capture and the original imprint is 0.952. This score, while less than all the scores obtained from comparing imprints of the same printed identifier patterns, is noticeably greater than the scores obtained from comparing imprints of different printed identifier patterns. There is therefore a risk that a counterfeiter seeks to reproduce the imprint of a legitimate identifier pattern.

A better image capture and/or a finer image capture would make it possible to reduce, even eliminate, the risk of such a falsification working. However, this is not always possible. In that case, if the identifier pattern is also a digital authentication code, it is advantageous to use its authentication properties at the same time by utilizing the following steps:

during a step 761, the identifier pattern is identified or checked, during a step 762, the key or keys required to authenticate the digital authentication code is received and during a step 763, it is determined whether the digital authentication code is an original or a copy.

The digital authentication codes are usually based on the degradation of one or more physical anti-copy characteristics, which are sensitive to copying during the copy step.

Thus, the digital watermarks have a lower energy level in the copy, or even a different energy level ratio between a watermark not very sensitive to copying and a watermark especially sensitive to copying. Similarly in the case of spatial marking techniques, a lower level of energy, or correlation, is noted for the copies. For the copy detection patterns, based on an image comparison, an index of similarity (or dissimilarity) between the original copy detection pattern and the captured copy detection pattern is calculated; if the latter is a copy, the similarity index will be lower. Finally, for secured information matrices, an error rate is measured for the coded message extracted from the matrix; this error rate will be higher for copies (note that, thanks to the coded message's redundancies, the message sent is generally decodable without error).

It is noted that, for each of these methods, one or more values are measured that are generally continuous, and which do not explicitly specify the nature of the document (original or copy). A pre-defined criterion for distinguishing originals from copies must generally be applied, for example by comparing the obtained value or values against one or more "threshold" values, so as to determine whether the measured value or values correspond to a "copy" or an "original".

With respect to the embodiments of the process for securing documents based on the identifier patterns, the following steps can be utilized:

during a step 771, the owner of the rights grants a processor a license to produce a certain number of documents, during a step 772, the owner of the rights sends the processor one or more identifier pattern(s), possibly having a digital authentication code function, in the form of a digital image to be printed on the documents. The identifier pattern can be part of a digital document's design, or be sent separately. In a variant, the processor receives the identifier pattern from a third party authorized by the rights holder, during the step 773, the processor prints the specified number of documents, with the specified identifier pattern or patterns on each document, during a step 774, the specified number of printed documents is sent to the rights holder. In a variant, the documents are sent to the assembler authorized by the owner of the rights. In a variant, the specified number of printed documents is directly processed by the processor during the step 774, as described in variants.

during a step 775, the owner of the rights/the assembler assembles the finished product (which can contain several documents), during a step 776, one or more images of the identifier pattern or patterns is or are captured. In theory, this process is performed automatically, for example, the products moving on a conveyor belt under the lens of an industrial camera. The industrial camera is triggered automatically or via external activation coming from a sensor, during a step 777, each captured image of an identifier pattern is stored in a database, with the associated information (manufacturing order, date, etc.), during a step 778, in real time or deferred, one or more imprints are calculated for each valid captured identifier pattern image, during a step 779, with the possible aim of using the identifier pattern in check mode (without database connection), one of the imprints, generally the one that occupies the smallest data volume, is quantified and/or compressed so as to obtain a compact representation of it. An information matrix (a datamatrix, a bar code, a secured information matrix SIM, etc.), for preference made secure with the help of a key, is generated containing the representation of the imprint. The information matrix is printed on the document containing the identifier pattern and during a step 780, if necessary, the set of calculated imprints is sent, by secure link, to the central server on which the inspectors are connected in order to check the validity of the imprints.

In variants:

the site where the images of identifier patterns are captured can be located at the printer or the processor, with the advantage that it can be integrated into the production, and the disadvantage that it is in an exposed area. The machine used for calculating and/or storing imprints can be made secure and/or the site can be located at the third-party authorized by the owner of the rights, generally the same as the supplier of the identifier patterns used.

FIG. 23 shows:

a step 605 of determining a matrix of dots representing information associated to an object to be authenticated, a step 610 of affixing a mark to said object in such a way that the affixed mark presents unpredictable errors due to the physical characteristics of the means utilized during the marking step, a step 615 of capturing an image of said mark, a step 620 of determining physical characteristics of said unpredictable errors by processing said image, a step 625 of memorizing information representing the physical characteristics of the unpredictable errors and a robust marking step 630 during which a robust mark bearing information relating to the physical characteristics of the unpredictable errors is affixed to said object.

During the step 605, the information matrix is determined, for example in the form of a matrix of areas, each bearing hundreds of dots and each representing an item of binary information. The item of information associated to the product is, for example, the name of its manufacturer, the product's manufacturing order and/or date of manufacture.

During the step 610 you affix the mark formed of a matrix of dots with a resolution such that at least two percent of the mark's dots are erroneous compared to the original dot matrix. For example, a printer's maximum resolution is used. The effect of this resolution is such that, in particular, copying the object, which entails copying the mark, for example by optical or photographic processes, increases by at least fifty percent the level of errors in the copied mark compared to the original mark.

During the step 620, you determine, as physical characteristics of the unpredictable errors, the characteristics of the distribution of said errors in said mark. For example, you determine the vector going from the center of the mark to the barycenter of the errors borne by the mark, and then you assign a weight to the errors depending on their position and you determine a new vector going from the center of the mark to the barycenter of the errors and so on.

During the step 630, the robust mark is, for example, a one- or two-dimensional bar code or a data matrix, known under the name datamatrix (registered trademark). Because this second mark is robust, it can resist slavish copying and enable the object to be identified. For preference, during the step 630, you utilize a code key, for preference a public code key, of the physical characteristics of the unpredictable errors.

Thanks to the utilization of the present invention, even though the same marking process is utilized, without modification, for example by etching or printing, on many objects, the physical characteristics of the marking errors make it possible to give each mark, and thus each associated object, a unique identification.

When a new image capture is carried out with a marked object and new image processing is applied, the result of this image processing can be compared to the memorized information to retrieve the object's identification.

The error quantity is significant and allows the mark and the object to be uniquely identified.

The reading of the data relating to the object that bears the mark provides an origin and/or means of access to a database of physical characteristics of the errors.

Whatever the conditions in which a new image of said mark is captured, the error distribution characteristics can be retrieved.

For the utilization of certain embodiments of the present invention, the inventor has discovered that certain print characteristics can allow the originals to be distinguished from copies very effectively. In particular, the variation in the dimensions, or "size", in the precise position or shape of the marked dots can be measured and integrated in a metric allowing the originals to be distinguished from copies. It is noted that the variation in the color level (or grey scale) in the image to be printed amounts, because of the screening, to a variation in shape or dimensions. The digital authentication codes mentioned previously are not designed to measure these characteristics precisely. On the contrary, all digital authentication codes of known types have performances deteriorated by the variations in position due to unanticipated unknowns in printing, variations that are disruptive for the measurements used. At best, methods are used to seek to eliminate them. Moreover, the digital watermarks and AMSMs are designed to make it possible to measure the overall characteristics of the signal (energy, for example), which are not very precise for differentiating between the originals and the copies.

FIG. 1 shows a digital mark 105 comprised of a set of dots 110 with random positions surrounded by a black border 115. It is noted that the dots 110 in this original mark are all of the same size, namely 1 pixel for an image printed at 600 pixels/inch. FIG. 2 shows a print 120 of this digital mark. FIG. 3 shows a photocopy 125 of this mark. It is noticed that, in the photocopy 125, the dots 110 have disappeared. With a simple measurement, such as the number of dots still present in the mark, an image of which is captured by an electronic image sensor, or a degree of correlation with the reference mark, it is easy to distinguish an original 120 from a photocopy 125, or a low-quality copy.

FIG. 4 shows a high-quality copy 130. This copy has been made based on a high-quality capture of an image with a scanner, a capture commonly called a "scan", by restoring to their original state the dots 110 detected automatically (for example, by using the Matlab software system, registered trademark), given that these latter are black and $\frac{1}{600}^{th}$ of an inch in size. It is seen that all, otherwise most, of the dots 110 present in the original in FIG. 2 are present in FIG. 4. Any counterfeiter's task is, unfortunately, made easier by the fact that, all the dots originally having the same size, the measurement of the size or grey scale of the dots does not have to be known and the dots can simply be reconstituted in their original size (which, being fixed, is easy to determine over a large set).

For preference, by utilizing certain aspects of the present invention, simply counting the dots present is not enough to distinguish the original from the copy. A method based on the correlation or the level of energy, as used by the AMSMs, is also ineffective for detecting good-quality copies.

For this purpose, in preferential embodiments, in order to widen the opportunities for using dot patterns, determining a document's authenticity entails paying special attention to the geometric characteristics of the dots, which are studied at the local level, unlike prior state of the art methods. In particular, the exact position, shape and/or size of the dots are used for detecting copies, storing information and/or for uniquely characterizing documents. The VCDPs that are the subject of particular embodiments of the present invention thus present the particularity that the exact position, shape and/or size of the dots are variable.

For preference, for generating the dot distribution in this VCDP, dots are produced of which at least one geometric characteristic is variable, the geometric amplitude of the generated variation being of the order of magnitude of the unpredictable geometric variation of the dots when printed, known/measured for the printing system.

The description that will follow concerns:
 VCDP digital design methods,
 methods of measuring VCDP geometric characteristics,
 methods of combining the measured geometric characteristics of the VCDPs in a metric allowing original VCDPs to be distinguished from copied VCDPs,
 methods of optimizing the printing of VCDPs,
 methods of identifying VCDPs on the basis of their geometric characteristics,
 methods of checking VCDPs,
 methods of storing information in the VCDPs and
 a process for securing documents.

First of all, a method of generating a variable characteristic dot pattern is described below. In order to generate a VCDP, you determine, beforehand, the print quality of the print system that will be used for printing the VCDP on the document, during a step 300. The print quality represents an unpredictable variation of at least one geometric characteristic of the printed dots, dot by dot, caused by the printing, as a result of unanticipated unknowns in printing.

Then you determine the surface area available for printing this VCDP, the resolution of the print system and the maximum density of the dots wanted, during a step 302. For example, the available size can be about ⅙×⅙ inch, and the density 1/100 (about one out of 100 pixels can be printed). The maximum density depends on the accepted degree of visibility for the VCDP, which is a function of the application conditions (color of the ink, medium, type of printing, appearance of the document, for example). The density can be greater, for example a density of 1/16 or ⅛ is possible, even ¼. For preference the VCDP is generated so that the dots printed do not "touch".

In certain cases, the size available can be much larger, for example several square inches. However, most of the means of capture, for example cameras comprising an array image sensor, offer a capture surface area that does not allow this area to be covered (flat-bed scanners are not generally available when documents or products must be read "in the field").

In this case, you can "tile" the VCDP, i.e. juxtapose the same VCDP, or juxtapose different VCDPs for security reasons. In the rest of the description, these two types of VCDP juxtaposition, respectively identical or different, are called "tiling".

In assuming that the capture tool can be applied arbitrarily over the print area, the maximum size of the VCDP in order to ensure that at least one VCDP will be fully contained in the capture surface area is equal to half of the smallest side of the capture surface area. For the example mentioned earlier of a 640×480 CCD operating at 1220 dots/inch (surface area of 1.33 cm by 1 cm), the VCDP should not exceed 0.5 centimeters a side.

The VCDP is subsequently generated in such a way that:
 at least half the dots of said distribution are not laterally juxtaposed to four other dots of said dot distribution, and
 at least one dimension variation of at least one part of the dots of said distribution of dots is of the same order of magnitude as the average for the absolute value of said unpredictable variation.

The inventors have, in effect, discovered that the print of the original must present such a ratio of orders of magnitude in order to obtain more effective securization functions (authentication and identification) of the document.

In addition, the inventors have discovered that, in certain embodiments, in order to make a document secure against copies causing, as a result of unanticipated unknowns in copying, a so-called unpredictable "copy" variation, dot by dot, of said geometric characteristic of the printed dots, it is preferable that when printing a distribution of dots on the document, said printing causes, as a result of unanticipated unknowns in printing, a so-called unpredictable "print" variation, dot by dot, of said geometric characteristic of the printed dots, the average magnitude of the unpredictable print variation being of the same order of magnitude as the average minimum magnitude of the unpredictable variation of said copies. For preference, you then perform a step of determining a physical magnitude representing the unpredictable print variation, as described elsewhere with reference to the functions of authenticating and identifying a document.

For example, you can use a VCDP of 200×200 pixels printed at 1200 dots per inch, for a printed surface area of ⅙ inch, the "dots" of which measure 2×2 generation pixels when the average of the absolute value of the unpredictable variation is between 0.2 pixels and 20 pixels. Note that a VCDP of 100×100 pixels printed at 600 dots per inch, with dots of 1×1 pixel, may give a comparable result. Nevertheless, a higher image resolution (for the same size of printed area) allows more flexibility in varying the size and/or the position of the dots, as detailed below.

For preference, dots that are superposed, stuck together, or too close, are avoided. For this purpose, the VCDP is divided into adjacent areas, for example into 10×10 areas of 20×20 pixels each, for a VCDP of 200×200 pixels. By leaving a white border of 1 pixel on each of the edges of each area, an area of 18×18 pixels is available for the dot. There are therefore 17×17=289 possible positions for each dot in the area that is reserved for it (the dots taking 2×2 pixels, their highest and left-most points, for example, can only take 17 lateral positions and 17 longitudinal positions).

For security reasons, it is desirable that the VCDP is of a pseudo-random nature, for example generated from a cryptographic algorithm to which a key is supplied that is kept secret. This key is used as the initialization value of an algorithm generating pseudo-random numbers, which can be retrieved by anyone whatsoever who knows the key, but which are very difficult to find for anyone who does not have the key.

Figure 16A:
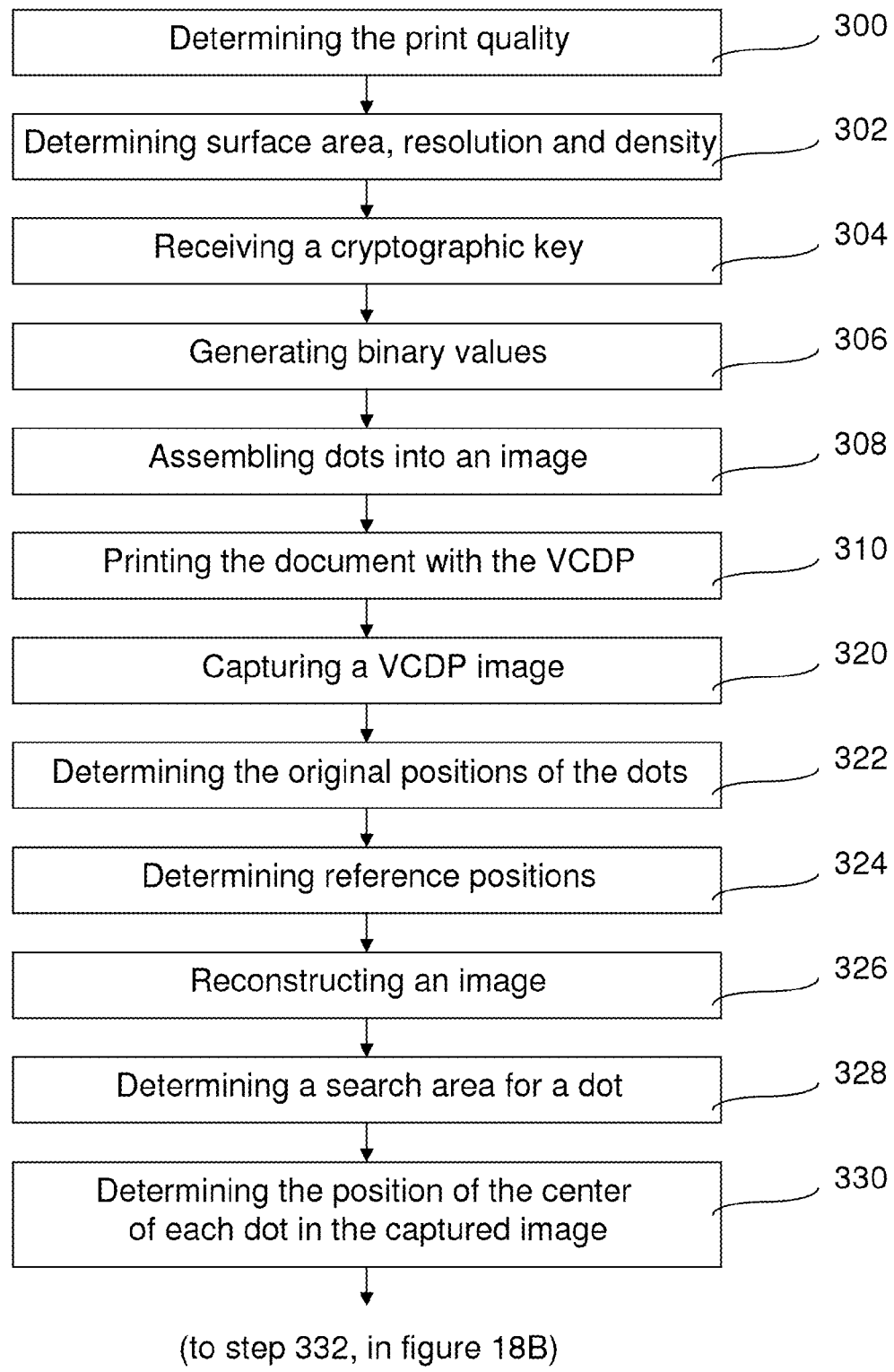
Figure 16B:
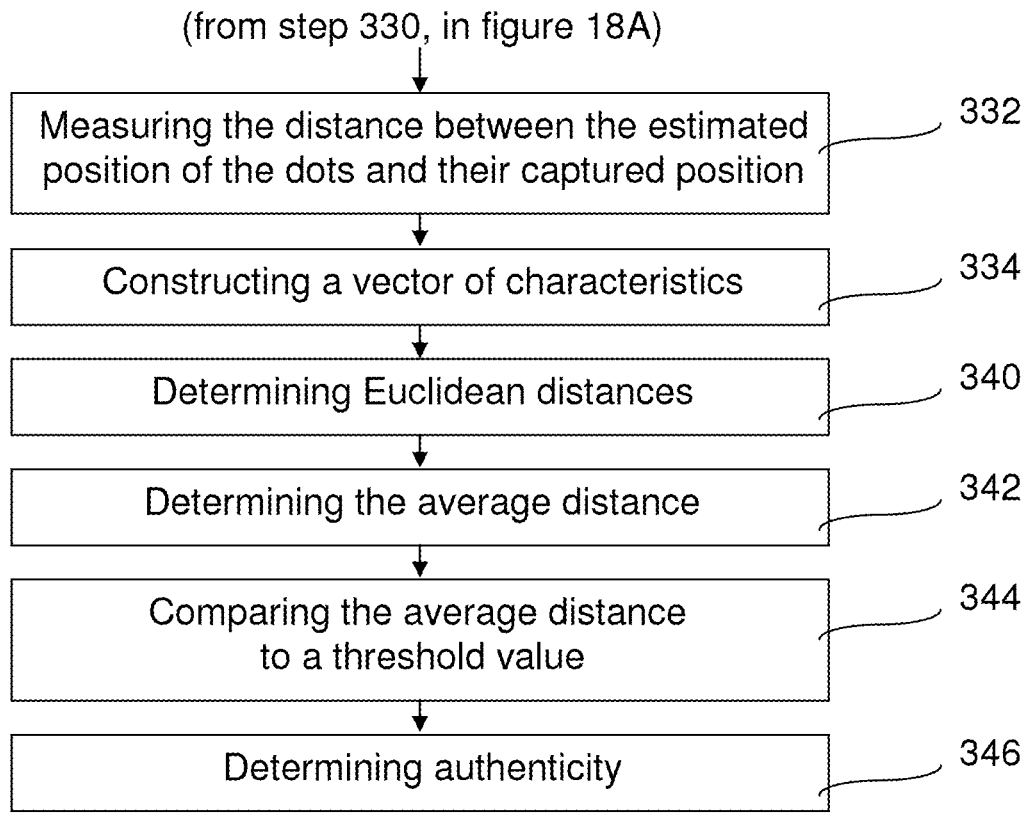
Figure 17:
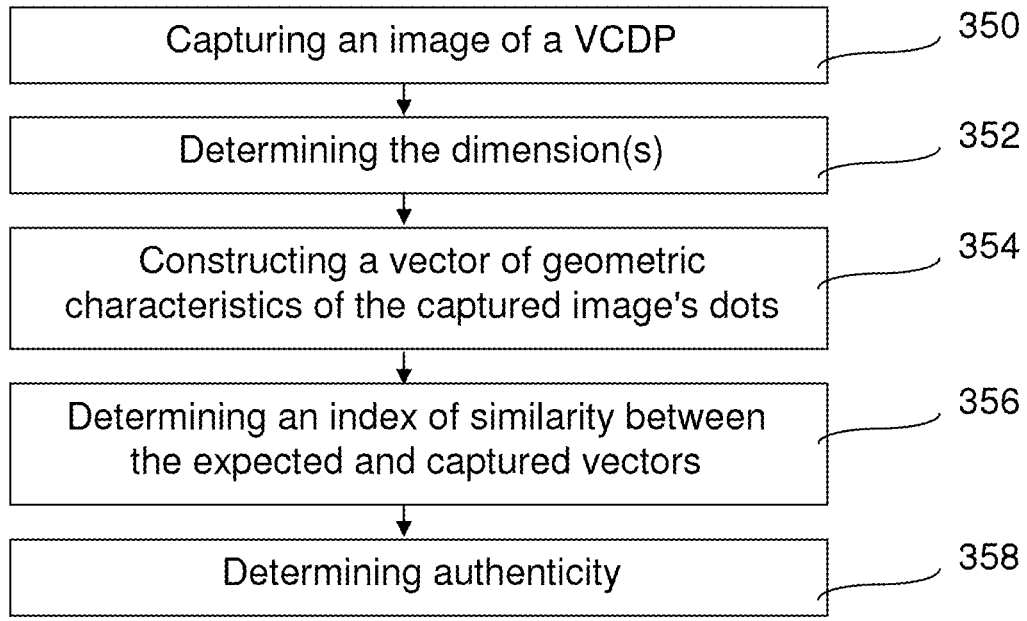

As FIG. 16A shows, in order to generate a VCDP you carry out:
- a step 302 of receiving or determining the surface area available, and of the resolution of the print system and the print density,
- a step 304 of receiving a cryptographic key, for example a 32-byte (256 bits) sequence,
- a step 306 of generating binary values, for example by using a recursive encryption or hashing function, the algorithm being initialized with the cryptographic key. For example, for the example mentioned above, there are 289 possible positions for the dot, and therefore 9 bits are required to determine the position of a dot in the area reserved for it. Thus, 900 bits are required to determine the positions of 100 dots in their respective areas. Assuming that the SHA-1 hashing function is used, with 256-bit input and output, the function must be called four times in order to obtain the necessary binary data and
- a step 308 of incorporating a dot in each cell and assembling cells into an image, in this case 200×200 pixels in size. For example, during this step 308, successive nine-bit sequences are used, in order to determine the position of a dot in each cell. When the value represented by this sequence is greater than 289, the next sequence is taken. If not, the dot is positioned at the position identified by the sequence, for example by numbering the successive positions in each line of possible positions. Then the cells are juxtaposed, for example successively in each line of cells.

Following the step 308, the VCDPs are incorporated in the print films and the document is printed, during a step 310.

In variants, each dot can have a variable size. For example, the dots can have a surface area greater or less than 2×2 pixels. Thus, the dots can have several sizes offering the possibility of measuring other geometric characteristics that are difficult for the counterfeiter to reproduce. For example, the dots can have two possible sizes, either 2×2 pixels as given previously, or 3×3 pixels, unequal vertical and horizontal dimensions, for example 2×3 or 3×2, also being possible. Note that, in the case of two square dots, an additional item of binary data is needed to identify the size of the dot, an item of data that is added to the nine items of binary data that identify the position of the dot in the area reserved for it. Thus, ten items of binary data are needed per area, and 1000 items of binary data for the 100 cells.

FIG. 5 shows a VCDP 135 with dots whose dimensions vary pseudo-randomly (dots of 2×2 and 3×3 pixels) and a border 140 surrounding the VCDP 135. FIG. 6 shows a detail of the result 145 of printing the VCDP 135 of FIG. 5.

It is noted that, in variants, a border, in this case 140, or arbitrary shapes are added allowing the VCDP to be localized. For example, synchronization blocks are added on the borders or in the VCDP, in the place of areas containing dots.

With respect to the measurements of a VCDP's position characteristics, the inventor has discovered that, while the dots comprising a VCDP can be determined and reconstituted with quasi-certainty by a counterfeiter, it is very difficult for the latter to be able to reduce the uncertainty concerning the precise position of the dots. In effect, when a VCDP is printed, the dots are not necessarily printed in their exact position: this uncertainty is due to unanticipated unknowns in printing, and it is also caused by passing from digital to analog. In effect, by passing from digital values to analog values during printing, then again to digital values when the image is captured, there is an average uncertainty of around a half-pixel, (print and image capture pixels respectively) in the position of the dots, the second uncertainty being independent of the position uncertainties due to the unanticipated unknowns in printing. Note that, according to the stability of the print means, additional position uncertainties can be added. When a high-quality copy is produced, additional re-print position uncertainties are added to the position uncertainties already present. Thus, the variance between a dot's position in the captured image and this dot's position in the original image is, on average, greater if the captured image is a copy than if it is an original.

An algorithm for measuring a VCDP's geometric position characteristics is described below. An image captured, during a step 320, from a document area containing a VCDP and a cryptographic key are used on input. On output from the steps implementing this algorithm, a vector of the position characteristics of the VCDP's dots is obtained.

- by applying the VCDP design algorithm, the original positions of each of the dots is determined, during a step 322;
- during a step 324, the position of a set of position reference shapes in the captured image is determined, it being understood that the VCDP itself, or a part of it, can serve as a reference shape, since it is known. For example, these reference cells can be indicators of corners, the border of a square. Other known techniques for determining position can also be used, such as autocorrelating tiled images.
- from the reference shapes, an image is reconstructed that is the same size or a whole multiple of the original size, during a step 326;
- for each cell, during a step 328, you determine a search area in the captured image in which the image of the dot must be located (For example, if the VCDP is printed at 600 ppi (acronym for "points per inch") and is captured at 1200 dpi (acronym for "dots per inch", signifying capture pixels per inch), an area of +/−5 pixels corresponds to an area of +/−2.5 pixels in the original image). A relatively large search area is necessary since the initial position of the reference cells can be imprecise;
- if the dot is a dark color on a light background, during a step 330 the position in the reconstructed image, or in the captured image, of the pixel having the minimum luminance value in the defined area is determined, and if the dot is a light color on a dark background, during step 330, the position in the reconstructed image, or in the captured image, of the pixel having the maximum luminance value in the defined area is determined. This position of a pixel is considered to be the position of the center of the dot in the captured image;
- the distances, in each direction, between the two positions are measured, during a step 332 and
- all of the distance measurements are compiled into a vector of geometric characteristics, during a step 334.

In this way, for a VCDP of 100 cells a vector of size 100×2 is obtained. Because of imprecisions in the position of the reference cells, a systematic bias can exist. For preference, during the step 332, this bias is compensated for by calculating the averages of the horizontal and vertical distances and subtracting this average from the corresponding distances (in effect, a zero average is expected for the imprecisions in position).

In variants:
- other characteristic values of each point are used to determine its position, For example, the luminance value of the dot's central pixel, the response value to a filter of dots corresponding to pixels, etc and/or
- the positions of dots are determined without reconstructing the image, taking into account the scale factor in the captured image, as well as the latter's rotation and translation, in determining search areas for the precise position of each dot.

With respect to distinguishing, or differentiating between original VCDPs and copied VCDPs utilizing the vector of position characteristics, you can proceed as follows:

for each dot, you calculate the Euclidean distance between the position of the dot calculated according to the captured image and the original position, during a step 340, during a step 342, you calculate the average, or median, of this distance over all the dots, in order to obtain a measurement of the average distance, during a step 344, you compare this average distance to a pre-defined threshold and, during a step 346, you determine whether the VCDP is an original or a copy, in the following way:

if the average distance is below the threshold, the VCDP is considered to be original, otherwise, it is considered to be a copy.

The following example illustrates the proposed method. The same original VCDP has been printed and then captured three times. The average distances calculated over the vectors of position characteristics for the originals are 0.454, 0.514 and 0.503 image pixels. Three high-quality copies have been made, each from one of the three printed VCDPs. The average distances calculated over the vectors of position characteristics for these copies are 0.965, 1.088 and 0.929 image pixels. It is noted that, based on the average distance, the original VCDPs can easily be separated from the copied VCDPs simply by thresholding. Several threshold values are possible, depending on the relative cost of possible errors ("false positive": detecting a copy as an original, or "false negative": detecting an original as a copy). A threshold of 0.75 (image) pixels can be an acceptable compromise if the relative costs of each type of error are equivalent.

Other known mathematical techniques, for example based on statistical and/or shape recognition methods, can be used so as to distinguish original VCDPs from copied VCDPs.

With respect to distinguishing, or differentiating between original VCDPs and copied VCDPs using the values of the geometric characteristics of the dots, as was noted above, if the dots are of a constant size it is easy for the counterfeiter to reproduce them with a size that conforms, even if the dots can appear with a variable size in the original mark. In an embodiment, during the generation of a VCDP, one or two dimensions of the dots are made to vary.

During the analysis of a document's authenticity, after having captured an image of the VCDP, during a step 350, you determine the dimension or dimensions of the dots according to their central image pixel's degree of luminance, their response to at least one matrix filter corresponding to image pixels, etc, during a step 352.

Then, the original VCDPs are distinguished from the copies according to the degree of similarity between the dimensions of the original digital VCDP's dots and the dimensions of the corresponding dots in the captured image of the VCDP to be authenticated. For example, you proceed as follows:

during a step 354, by applying the VCDP design algorithm you determine a vector of expected dimension characteristics. For example, the vector of expected characteristics can be the value of the surface area of the dots or their two dimensions, horizontal and vertical;

during a step 356, you calculate an index of similarity, for example a coefficient of correlation, between the vector of expected characteristics and the vector of characteristics obtained after processing the VCDP's captured image and during a step 358, you determine whether the VCDP is authentic, by comparing the index of similarity with a pre-defined threshold value:

if the value of the index is greater than the threshold, the VCDP is considered to be original and if not it is considered to be a copy.

The following example illustrates the proposed method. The same original VCDP, illustrated in FIG. 5, in which the dimensions of the dots vary between 2×2 pixels and 3×3 pixels, has been printed and then captured three times. The vector of characteristics comprises surface area values of 4 and 9 pixels for dot sizes of 2×2 pixels and 3×3 pixels. The vectors of characteristics contain the average luminance value of a region surrounding the dot, less the luminance value of the dot. Therefore there is a higher value if the dot is printed more heavily, which is generally the case for the dots of 3×3 pixels.

The indices of similarity calculated are, for the three original prints, 0.654, 0.673 and 0.701. Then three high-quality copies have been made, each from one of the three printed VCDPs. To make the copies, the positions of the dots were determined, then their degree of luminance was measured. The median degree of luminance of the VCDP's dots has been calculated, and the dots having a luminance less than the median degree of luminance have been considered to be originally of size 3×3 pixels, versus a size of 2×2 pixels for the dots having a degree of luminance greater than the median degree of luminance. The copies have been printed and captured. The indices of similarity calculated are, for the three copies, 0.451, 0.423 and 0.446. It is noted that, based on the average distance, the original VCDPs can easily be separated from the copied VCDPs simply by thresholding. Several threshold values are possible, depending on the relative cost of possible errors. A threshold of 0.55 for the index of similarity can be an acceptable compromise if the relative costs of each type of error are equivalent.

Other known mathematical techniques, for example based on statistical and/or shape recognition methods, can be used so as to distinguish original VCDPs from copied VCDPs.

The description given above basically concerns making a document secure against copying. The rest of the description involves two other forms of securing a document, firstly to uniquely identify documents that have not been printed by a "variable" print process and secondly to carry information concerning the document, for example a reference number, its date of manufacture, its place of manufacture and its manufacturing order, the name of the owner of the intellectual property rights linked to the document or its destination.

Methods of identifying VCDPs on the basis of their geometric characteristics are described below. It entails, in this case, using measured characteristics of the VCDPs to uniquely identify each of the prints from a single source digital VCDP image. In effect, each print of a VCDP produces unique unanticipated unknowns in printing, which can be found in different captures of the same print. Thus, by storing the characteristics of a VCDP's successive prints in a database, or by storing them, preferably in a secure way, on the document containing the VCDP (for example in a 2D bar code), a print of a VCDP, and thus a printed document bearing it, can subsequently be identified, i.e. uniquely recognized, by searching for the correspondence between the geometric characteristics of the VCDP whose image was captured and the stored geometric characteristics.

For preference, the identification and authentication are combined, the same device for capturing and processing the image providing both an indication of the document's authenticity and of the document's identification.

Several geometric characteristics of the dots can be used, such as the precise position, or the measurement of luminance, the dimension or dimensions of the dots and their shape. The degree of luminance, measured by the dot's average, central or minimum grey scale, is especially discriminating since it varies significantly and unpredictably over different prints of the same source image. It is noted that it is not necessary to use dots with variable sizes or shapes in the source VCDP for the characteristics of the dots to vary from one print to the next. In order to illustrate this, FIG. 7 shows two prints of a single VCDP having a constant dot size: a dot 151 is printed more heavily in the lower image than in the upper image, while a dot 152 is printed more heavily in the upper image than in the lower image.

By capturing each of the three printed VCDPs three times, a total of nine captured images are obtained. The vector of characteristics containing the minimum luminance value of the dots is calculated for each of the nine image captures. Then you calculate an index of similarity, i.e. a coefficient of correlation, between the vectors of characteristics of each of the 9*8/2=36 possible pairs of captured images. Out of these 36 pairs, 9 correspond to different captures of the same print, and 25 to captures of different prints. The average for the index of similarity is 0.9566 with a standard deviation of 0.0073 and a minimum value of 0.9474 for the first group, and 0.6203 with a standard deviation of 0.0272 and a maximum value of 0.6679 for the second group. The difference in the index of similarity between the two groups is very significant, and shows that a printed VCDP can be identified without ambiguity on the basis of a vector of characteristics of dots.

Figure 18:
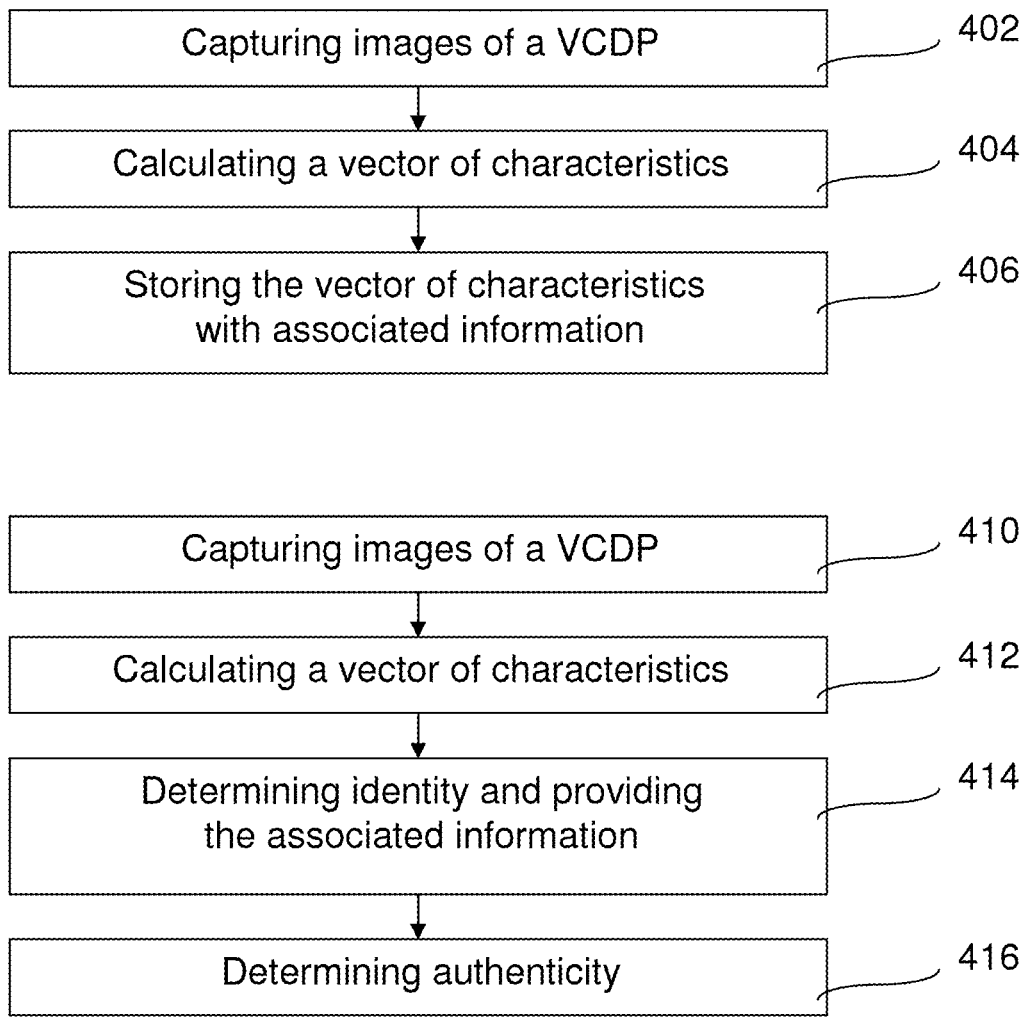
Figure 19:
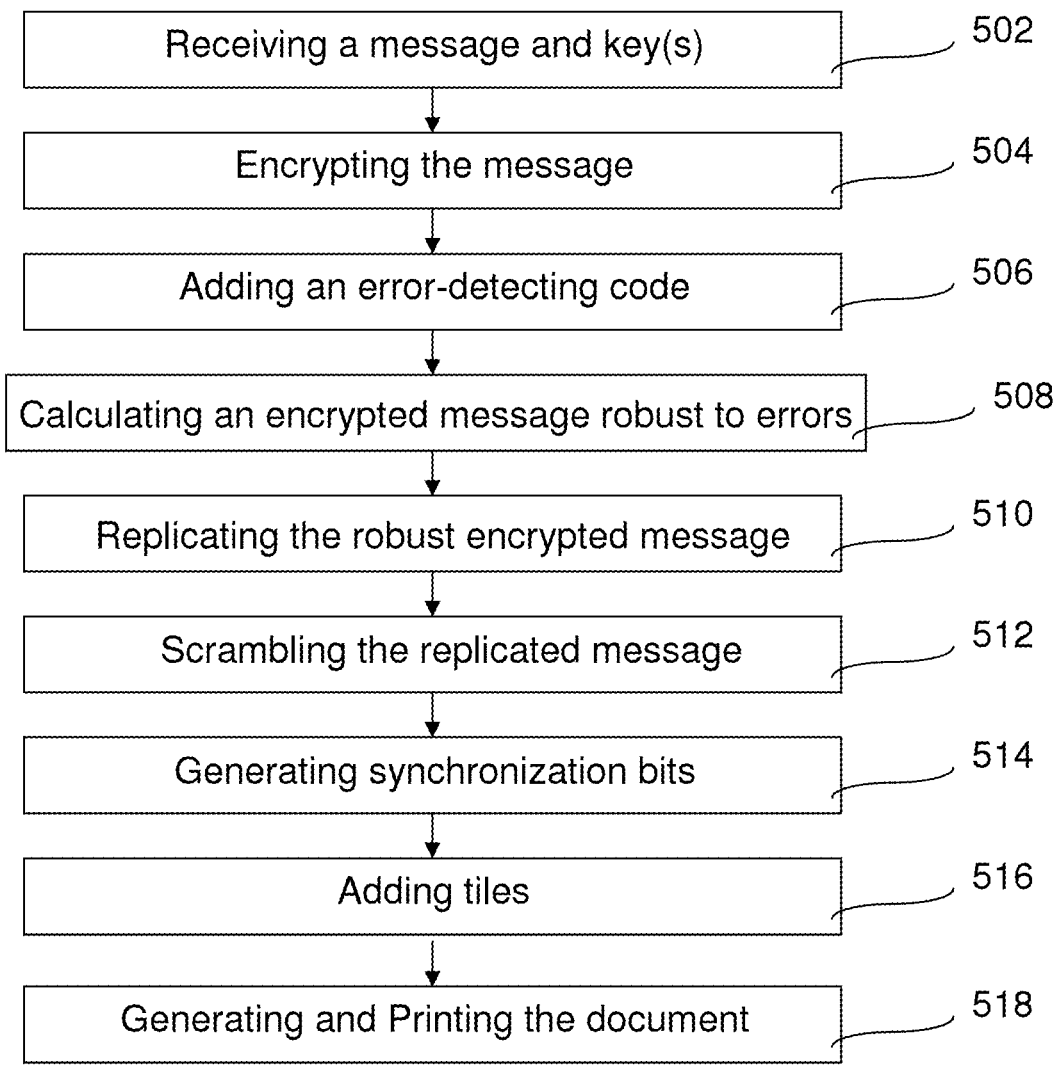
Figure 20:
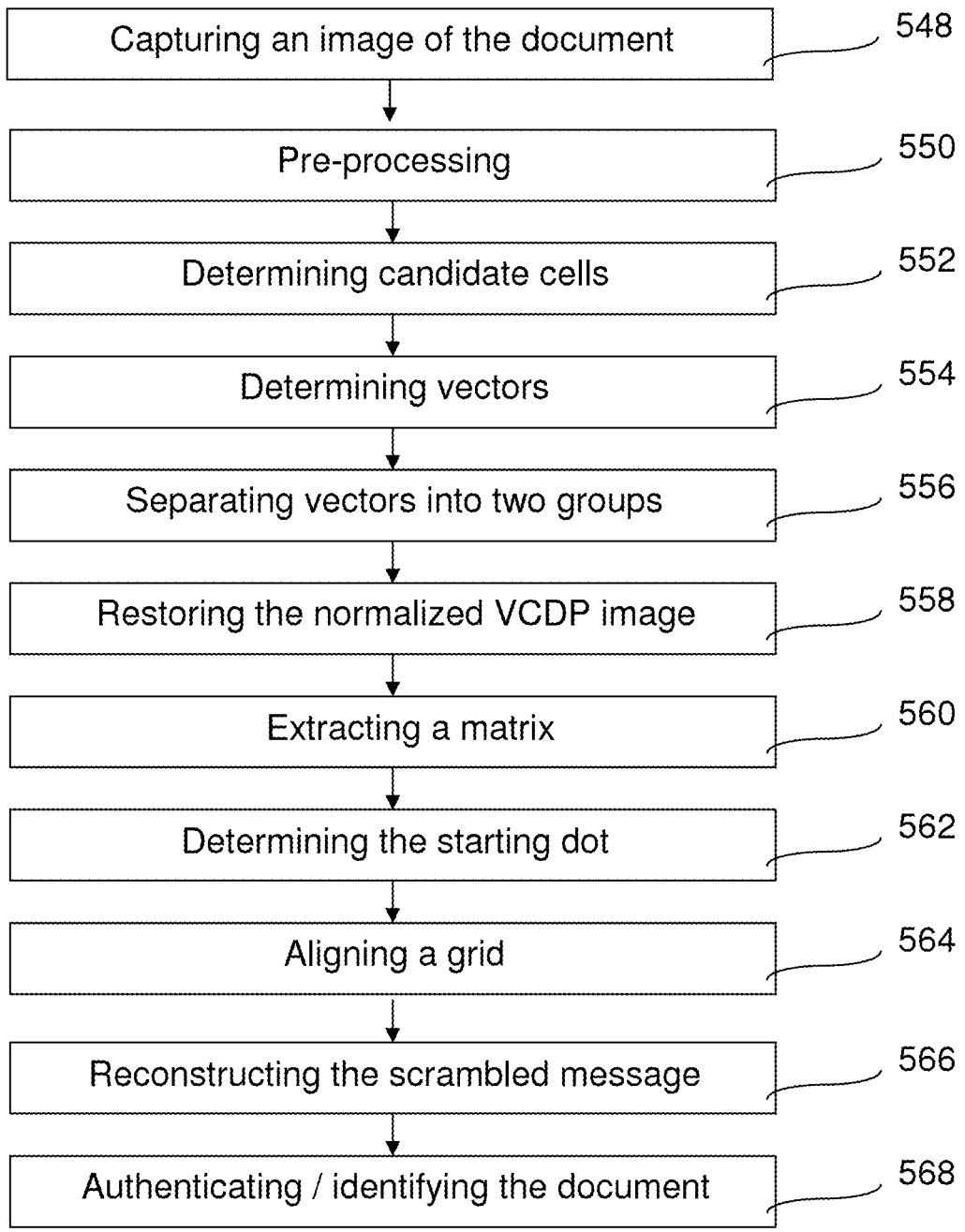

FIG. 18 details steps in an identification procedure corresponding to this approach. During a step 402, an image of a printed VCDP is captured. Then, during a step 404, the vector of characteristics containing the average values of the minimum luminance of the dots is calculated. This vector of characteristics, or "signature" of the printed VCDP, contains, for each dot, the average luminance measurement and, possibly, the standard deviation between luminance measurements. It is noted that certain measurements of luminance can be excluded based on their difference from the average of the other measurements and the standard deviation between the other measurements. Then, during a step 406, the vector of characteristics is stored, in a database, with indications concerning the document's production and/or circulation.

During an identification attempt, during a step 410, an image of a printed VCDP is captured. Then, during a step 412, the vector of characteristics corresponding to the stored vector of characteristics is calculated. During a step 414, the stored vector of characteristics closest to the vector of characteristics calculated during the step 412 is determined and the associated information is retrieved.

In a variant, the vector of characteristics determined during the step 404 is also stored on the document itself, in a robust way, i.e. resistant to copying, for example in a two-dimensional bar code or a Datamatrix (registered trademark), preferably encrypted for security reasons. In this case, the document can be authenticated by comparing an index of similarity between the two vectors of characteristics and a threshold value, pre-defined or itself stored in the bar code, during a step 416.

In order to store information in the VCDP, you can, for example, define two possible shapes, two positions or two dimensions for each of the dots, inside the cell assigned to it, so as to store one bit per area. A bit value ("0" or "1") is assigned to each position, dimension or shape.

With reference to FIG. 5, which illustrates a VCDP with two sizes of dots, the small-size dots (2×2 pixels) can, for example, represent bit value "0", and the large-size dots (3×3 pixels) can represent bit value "1".

Thus, for a VCDP with 100 cells, 100 bits can be stored without redundancy. In order to detect and/or correct errors, use of an error-detecting and/or error-correcting code is desirable.

For the case in which the position is used to represent a binary value, it is preferable that the positions corresponding to each of the two values are separated from each other. A possible method for ensuring the separation of the two positions consists of dividing a cell into two equal-sized parts corresponding to the two bit values, and assigning a position pseudo-randomly in the area corresponding to the bit to be coded. It is noted that a dot's position in a cell can represent more than one binary value, because of the multiplicity of possible positions. For example, as was seen above, this position can represent 8 bits over 289 different positions, or 6 bits if one position out of two in each direction is excluded, so as to limit the risk of error in interpreting the position during reading.

On reading the VCDP, you determine a search area around a dot's two possible positions for each sub-cell. In order to determine which of the two sub-cells contains the dot, you determine the minimum luminance value for each of the two sub-cells: the area having the lowest luminance value is considered to be the one in which the dot has been inserted. In a variant, a weight can be assigned to each bit value, according to the difference or ratio of luminance between each of the two sub-cells.

In variants:
 the dot's presence or absence in the cell is used to represent an information bit (used below in the "grids");
 more than one binary value is represented through more than two possible positions of a dot per cell;
 more than one binary value is represented through more than two possible dimensions of a dot per cell;
 more than one binary value is represented through more than two possible shapes of a dot per cell and/or
 the message is encrypted before being encoded.

With respect to integration with other digital authentication codes, the VCDPs can be integrated with digital authentication codes so as to offer an additional layer of protection and/or an unobtrusive means of tracking documents. FIG. 8 shows a secured information matrix 155, which comprises, in its center, an area is which a VCDP 156 is inserted. FIG. 9 shows a secured information matrix 160, which is surrounded by a VCDP 161. It is noted that, in this latter case, the elements allowing the digital authentication code 160 to be located, for example its corners, can be used to locate and determine the approximate positions of the dots of VCDP 161.

In embodiments, means of identifying the VCDP through unobtrusive marks are utilized. In effect, in certain cases it can be desirable for the identifying marks to be more unobtrusive than a border, so that the position, even the presence, of a VCDP can be difficult to detect: for example, limited or broken border marks or corner marks can be inserted, or a digital authentication code or other associated symbols can be used to identify it.

If the same dot pattern is repeated several times, for example by tiling, dots can be identified and located with auto-correlation and cross-correlation techniques, such as the technique described in M. Kutter's article, "Watermarking resisting to translation, rotation and scaling", Proc. of SPIE: Multimedia systems and applications, Volume 3528, pp. 423-431, Boston, USA, November, 1998.

Another way of introducing unobtrusive reference marks into the VCDP consists of inserting cells constituted of a set of dots with easily identifiable shape characteristics. For example, if you want a dot to serve as a reference, you insert a significant number of dots neighboring a reference dot in order to obtain an easily identifiable cluster of dots. FIG. 10 illustrates a VCDP 165 the four corners 166 of which consist of a cell comprising a central dot and four very close neighboring dots, forming the corners of a square centered on the central dot. For detection, you start by detecting all the dots over a sufficient surface area, which will serve as "candidates". Then, for each dot, you determine the number of its neighbors at a distance less than or equal to a pre-defined distance. This can be done rapidly if the candidate dots are arranged on a grid, which allows the number of neighbors in a window to be counted rapidly. You retain a limited number of candidates, for example six candidates, that have the greatest number of neighbors. Known geometric techniques can then be used in order to determine which are the candidates corresponding to the reference dots, in this case the corners of the VCDP. For the VCDP 165, you know, for example, that three valid candidates must form a right-angles isosceles triangle.

Another way of introducing unobtrusive reference marks consists of inserting dots based on a line. FIG. 11 illustrates a VCDP 170 with, on the edges, lines 171 bearing a larger number of dots than the parallel dots located inside the VCDP 170. These edge lines can be detected by different line detection algorithms, for example by applying the Hough transform, and/or by applying a Sobel filter allowing the noise to be filtered.

In a variant, you apply tiling of the same VCDP or different VCDPs comprising lines of dots or identifiable marks, for example clusters of dots as illustrated in FIG. 10.

In a preferential embodiment, a VCDP is arranged in the form of a regular grid. In effect, in certain cases it can be advantageous to duplicate the VCDP, by tiling, over a large surface area, even over the whole of the document to be protected. In this way you make it very difficult, even impossible, to destroy a VCDP and you increase flexibility concerning the image capture position. In particular, the same VCDP can be inserted several times by tiling. Equally, a VCDP at least partially different from all the other VCDPs can be inserted. The means of identification described above can be used so as to be correctly positioned to read the VCDP. However, in practice, the reference, synchronization or identification elements can be difficult to detect correctly.

As will be seen below, you can make detection easier by arranging the dots in the form of a grid. The dots are inserted at regular intervals, for example with a space of between 4 and 12 pixels in each direction. On the basis of this principle, there are several ways of representing the information:
  the presence or absence of a dot allows an information bit to be represented, as in VCDP 175 illustrated in FIG. 12, in which the presence of a dot corresponds to bit value '1', and its absence to bit value '0';
  the size, the shape or an offset of a magnitude less than at least one dimension of the VCDP's dots allows information to be represented. For example, the selection of the dot, from four shapes or four dimension selections, makes it possible to represent, at each dot of a VCDP 180, two information bits, as illustrated in FIG. 14, which represents, enlarged, a detail of the VCDP 180. It is noted that this VCDP's dots can take dimensions, in pixels (the first figure indicates the height and the second the width), of 1×1, 2×2, 1×2 and 2×1 pixels corresponding respectively to the bit values "00", "01", "10" and "11". Many other combinations and shapes of dots are, of course, possible.

In a variant, on the principle of a perfectly regular grid, a slight displacement of a dot allows information to be represented. For example, displacing a dot making a surface area of at least two pixels, displacing a pixel horizontally and/or vertically allows two information bits to be represented. Many other possibilities are, of course, possible. Note that such a displacement of dots does not significantly modify the geometric characteristics, and therefore the advantages, of using a grid, especially in terms of identification.

A grid lends itself particularly well to determining the angle of rotation and resizing factor applied to the captured image. In effect, in particular you can make use of a Hough transform of the image, or make use of the determination of energy peaks in the Fourier space. FIG. 13 is a representation of the absolute value of the two-dimensional Fourier transform of the grid of FIG. 12, in which the light value dots correspond to energy peaks. The detection of these energy peaks enables the person skilled in the art to calculate the image's resizing factor and angle of rotation, allowing the latter to receive normalized dimensions, with a view to their processing.

Once the image's rotation and scale are known and, possibly, corrected, you determine the translation value, i.e. the displacement to be applied to the image so as to align the dots of the grid correctly. There are various possible methods for this. Common to all of them is fixing the values of a set of the grid's dots, which are, subsequently, looked for so as to align the grid. For example, the values of a set of dots, chosen pseudo-randomly according to a key, can be fixed. A cross-correlation between the grid's captured and corrected image and an image generated from values of known dots, generates a peak of correlation at the position corresponding to the displacement of the grid.

With regard to the writing algorithm, a large number of methods known to the person skilled in the art are possible. As an example, assume that there is a grid, tiled or not, of 20×20 cells based on the following hypotheses: printing is done at 600 dots per inch, and 1% of the surface area can be marked (to minimize the visual impact of the marking), which makes, on average, one dot every 10 pixels, in each direction. The tile is therefore originally 200×200 pixels; the means of image capture produces images of 640×480 pixels at the capture resolution of 720 pixels per inch. It is noted that you are assured that at least one tile will be fully contained in the captured image.

As input, a message, for example of 8 bytes, a cryptographic key and a scrambling key (the two keys may be identical) are received during a step 502. The message is encrypted during a step 504. Optionally, error-detecting bits can be added to it, for example two bytes making it possible to reduce the risk of error decoding the message by a factor of 2 to the power 16, during a step 506. From the encrypted message concatenated with the error-detecting code, 10 bytes in our example, the message robust to errors is calculated, for example by applying a convolutional code, during a step 508. For a convolutional code of rate two with a memory of seven, for eight bytes on input, a code taking 142 bits is obtained. If you have 20×20 dots=400 positions, this message can be replicated two times, thus obtaining a replicated message of 284 bits, during a step 510. Thus, you have 400−284=116 unused positions, which will be used for storing the synchronization bits used on detection for aligning the tile, as described below. The replicated message is scrambled during a step 512, i.e. in sequence, swapped and transformed by an exclusive-OR function. The swap and the bit values used in the exclusive-OR function are calculated from the scrambling key. In this way, 284 scrambled bits are obtained.

The 116 synchronization bits are generated pseudo-randomly from a key, and their position can also be determined pseudo-randomly, so that they are uniformly distributed in the tile, during a step 514.

The VCDP's image is simply modulated by adding to the positions defined a dot for the bit '1' (there is no modification for the bit '0'). Clearly, the dot can be composed to have a variable position, shape and/or one or two dimensions, according to the methods seen previously.

If you want to cover a large surface area, the tiles are added one after another, during a step 516. You can then, according to the variants, always use the same tile or make the message change for each tile. In an example of this second variant, one part of the message can remain fixed, while another part, for example a byte, is randomly determined for each tile. You can also apply a random rotation, a multiple of 90 degrees, to each tile, so as to make a counterfeiter's attempts to analyze the code more difficult. In addition, you can randomly insert synchronization bits or their inverse, i.e. for the synchronization bits you inverse the positions where a dot is inserted. The advantage of this latter approach is that the number of possible configurations increases without the reading becoming more complex, as will be seen. In considering the variations of orientation, you can therefore have 8 possible configurations for the synchronization bits, which makes their analysis more complex in the context of an attack by a counterfeiter.

The 200×200 grid of our example can be replicated, as described above.

The VCDP is then inserted into the print films and the document is printed, during a step 518.

With regard to the reading algorithm, you carry out:
a step 548 of capturing an image of the document,
a pre-processing step 550: pre-processing the image can be advantageous, especially for the following step of determining candidate dots. You want, through the pre-processing, to remove the spurious noises and illumination deviations. The application of an omni-directional high-pass filter, whose result is weighted with the initial image, makes it possible, for example, to reduce the illumination deviations, and the application of a median filter makes it possible to reduce the noise of isolated pixels;
the candidate dots are determined, during a step 552: the candidate dots correspond to image pixels whose luminance is a value below a threshold. This threshold is, for example, a percentage of the histogram, such as 1%, so that at most 1% of the pixels are candidate dots. The candidates that are too close (for example, a distance of less than five pixels) are eliminated, so that only those having the lowest value in the region are kept;
during a step 554, the vectors of neighboring candidate dots are determined and the angle of rotation and scale factor are estimated: a limit value is given for the distance between neighbors, and all the pairs of dots having a distance less than this threshold are listed. It this threshold is low enough only the four direct neighbors of a dot may be associated in a vector, otherwise the indirect neighbors (diagonally) may be associated. It is preferable to avoid having non-neighboring dots associated. To do this, you avoid a threshold value that is too high. You can then estimate the angle of rotation by bringing the angle of each of the vectors to a value between 0 and 90 degrees;
if the indirect neighbors are included, during a step 556, the vectors are separated into two groups according to their size (which is greater by a factor of the square root of two for the indirect neighbors), and you subtract 45 degrees from the angle calculated for the indirect neighbors. The scale factor can also be estimated by measuring the average distance between dots of a single group, divided by the distance in the original image if that is known;
in an option, during a step 558, the image is restored to form an image without rotation, in its original size or a whole multiple of its original size;
during a step 560, a matrix is extracted representing the values represented by the dots: the average distance between the dots, for example 10 pixels, and the dimension of the reconstructed image, for example 500×500 pixels, are known. A table with 50 lines×50 columns is therefore generated that will be used to store the message's estimated values, given that the relationship between the dimensions of the reconstructed image and the estimated distance between the dots correspond to a maximum threshold over the number of dots present in the image. In reality, if the grid of dots in the captured image had a significant angle of rotation, the number of dots in the reconstituted image will probably be significantly lower.
in order to fill this table with the estimated values of the message, during a step 562 you search for a starting dot for scanning the image. This dot can be, for example, the first candidate dot detected in the top left of the image, or the candidate dot with the highest probability of being a dot (for example the dot with the lowest grey scale). It is noted that it is important not to make a mistake in the dot selection; an error can have unfortunate consequences for the rest of the calculations. You can proceed by iteration on the chosen starting dot if the following steps of reading the message are unsuccessful. A value is stored in the table for the selected dot, for example its grey scale, or its lowest grey scale value, in a certain area around the central position, so as to avoid an erroneous measurement if the dot's estimated position is slightly offset with respect to the actual position, this offset being due to pseudo-random offsets intended to detect the presence of a copy or being due to any other imprecision in positioning. The value is stored in the corresponding position in the table, the positions of which in our examples go from (0,0) to (49,49): for example in position (0,0) if the starting dot is the first dot in the top left, or in position (32,20) if the starting dot with the highest probability is at position (322,204). All the image's positions from the starting dot are then scanned, storing the value found for each dot in the corresponding position in the table;
during a step 564 the grid is aligned: in general, the value table is offset with respect to the start of the tile. To negate this offset, you use the known bit values, i.e. the synchronization bits, which enable the offset to be determined. Thus, the known synchronization bits can be correlated with the table of values, for each possible offset, and for the four possible general orientations (0, 90, 180 or 270 degrees). The largest correlation value determines the offset and the general orientation. Alternatively, this could be the lowest or the absolute correlation value, if a tile is printed in negative, with respect to another tile. In the case in which the synchronization bits or their inverse have apparently been inserted randomly, the highest absolute correlation value is used to determine the offset. The correlation can be performed in the Fourier domain in order to reduce the quantity of calculations. It is noted that the tiles can also be delimited by continuous lines or by special concentrations of dots, which can serve as a guide for alignment;

during a step 566 you reconstruct the scrambled message: the scrambled message can then be reconstructed. For example, if this is contained in a 20×20 grid, a 20×20 matrix is generated and the values found are inserted into it. The rest of the decoding of the message can be carried out using standard prior state of the art methods. Once the scrambled message has been calculated, the inverse of the operations described in the reading algorithm described above are applied.

during a step 568, optional, like other measurements, if the grid has special characteristics allowing copies to be detected, for example the precise position or the size of the dots, these characteristics can be measured over the determined grid so as to make a decision about the nature of the document (original or copy) or the unique characterization/identification of the document.

FIG. 21 represents an enlarged part of a high-density VCDP, each line of a matrix of dots making up this VCDP noticeably bearing as many black dots as white background, these representing, or not, coded information. In the upper line 185 the lateral position of each dot is variable, whereas, in the lower line 186, the dimensions of the dots are variable, in this case between two values corresponding to 3×3 generation pixels and 2×2 generation pixels. It is understood that such VCDPs present an advantage of compactness in inserting a given number of dots in a document while benefiting from the advantages of the variation in dimension(s), position and/or shape, the average magnitude of which is of the order of magnitude of at least one dimension of a part of the dots and/or the unpredictable variation due to printing, for preference, less than the first of these dimensions. As is easily understood, at least half of this VCDP's dots are not juxtaposed to four other dots. In contrast, less than half of the dots do not touch another dot.

FIG. 22 represents an enlarged part of a dot dimension gradient VCDP 190. This part corresponds to a corner of a VCDP in which, through successive rings, here the thickness of one line but, in practice, of several lines, the dimensions of the dots are reduced. For example, the dots' dimensions are 6×6 pixels for the bordering ring at the bottom right of the part represented in FIG. 22, then 5×5 pixels for the next ring, then 4×4 pixels and so on.

Thanks to this particular disposition, for at least one of the rings the average magnitude of the unpredictable variations, dot by dot, of at least one geometric characteristic of the dots is of the same order of magnitude as one dimension of the dots of this ring.

It is understood that such VCDPs present an advantage of compactness in inserting a given number of dots in a document while benefiting from the advantages of the variation in dimension(s), position and/or shape, the average magnitude of which is of the order of magnitude of at least one dimension of a part of the dots and, for preference, less than this dimension and/or the average unpredictable geometric variation of the print.

For the print processes for which a same plate is used for printing the same image a large number of times, you know that each of these prints from this plate allows it to be uniquely distinguished from all of this plate's other prints: several methods are presented here for extracting and comparing these imprints and also for generating images maximizing the uniqueness of these imprints.

The inventors have discovered that each plate also possesses a unique imprint which is found in each of the prints it realizes. It has been discovered that it is possible to determine whether a print comes from a specific plate by comparing a captured image of the print and a captured image of the plate. Even more unexpectedly, it has been discovered that it is possible to determine whether two prints come from the same plate, by comparing the captured images of these two prints.

A source digital image is represented in FIG. 30, composed of identical dots of 4×4 pixels. This image has been marked on several different plates used for offset printing, and several different prints have been realized for each of these plates. It has been noted that, while each print gives a unique shape for each of the dots, the various prints from the same plate nevertheless present singular similarities. FIG. 31 represents high-resolution captures (at 20,000 ppi) of the top left corner of three pints of the image. The two top images are from prints from the same plate, whereas the bottom one is from a different plate. It is noted, in particular, that dots 801 and 802 of the two prints from the same plate, although different, present clear similarities in shape, whereas dot 803, from the other plate, has no similarity in shape with the first ones.

Using an imprint of the plate has a great advantage in the fight against counterfeiting. In effect, while in principle using each print's imprint allows the legitimate prints to be recorded and thus enables an effective protection, it is not always possible to record these imprints, for cost or logistical reasons. On the other hand, one or more images of different elements of the plate can be captured more easily, either on the plate itself or on a print of this plate. Subsequently, you can determine whether a suspect print comes from this plate or not. For example, if the file containing the document's digital data is stolen and used to create copies that can, theoretically, be perfect, you can determine that the prints came from another plate, and are therefore not legitimate.

In general, the discriminatory elements of a signature are located in the transition areas, for example the border of the letters in a text, the boundaries of a bar-code, in areas rich in high-resolution information such as SIMs, or at the borders of printed dots, such as in AMSMs and VCDPs. You can therefore concentrate on a small area very rich in discriminatory information and, for preference, carry out a high-resolution capture to extract a maximum of details. Images can also be generated and inserted that maximize the richness of the variations of details. For example, the image in FIG. 30, although it is very simple and several times comprises an identical dot (in the digital image), gives a signature relating to the plate, as well as a signature relating to the print, which is rich in information. It is noted that you can increase the density of dots, preferably avoiding having them touch, in order to increase the uniqueness of the signature. It is pointed out that the same characteristics extracted from the image can be used for a signature that serves both to identify the plate used for printing, and to identify a specific print made with that plate.

The image given in FIG. 30 was printed on ten different plates, then each of the ten plates was printed a large number of times. In total 120 images were captured at 2400 dpi, and for each image a vector of characteristics serving as signatures composed of the grey scale for each of the image's 169 dots. The grey scale measurement is simple to obtain, and is in fact representative of the print density and surface area of the dot, itself dependent on the surface area of the dot marked on the plate, which is variable. Of course, the exact measurement of the contour would be, in theory, preferable, since it is richer in formation, but at 2400 dpi the capture of the dot does not allow a very precise determination of this. The grey scale is therefore a very degraded information, but as we will see here it is sufficient for determining the plate's identity, or for checking that two prints came from the same plate.

The statistical correlation has been measured and illustrated in FIG. 32 between the vector of characteristic for a capture of a print and other captures of the same print, in 811, captures of other prints from the same plate, in 812, and captures of prints from other plates, in 813. In 811 the correlations with the captures of the same print, located between 0.6 and 0.65, are observed. It is noted that if the capture was at a higher resolution or of a better quality, you should have values close to 1. In 812 there are ten captures from images of prints from the same plate, with correlations between 0.2 and 0.3. Even if these correlations are relatively low, which is partly due to the capture quality, they are significantly different from 0, which is actually explained by the "tattoo" effect of the plate. In 813 there are 100 captures from prints of different plates, with correlations of 0 on average, as you would expect. All the correlations for group 813 are differentiated from those for group 812. Thus, with a well-chosen threshold value, for example 0.15, you can identify the images coming from the same plate.

If a very high resolution image is available, for example such as the images illustrated in FIG. 31, you can make much more precise measurements, for example making use of the exact contour of a dot. These measurements mean that signatures can be obtained that are more discriminatory and of better quality. In particular image analysis methods known to the person in the field can be used. For example, to measure the similarity between two objects you make use of the similarity in their contour represented by a one-dimensional vector representing the distance to the centre of gravity according to the angular direction. Such a method, and others that can also be used for the same purpose of comparing two objects, are described in "Machine Vision: Theory, Algorithms, Practicalities" by E. R. Davies.

In a first embodiment, for identifying a printing plate for a document, are carried out:
  a step of printing at least one document with said plate,
  a step of capturing, at high resolution, at least one image of at least one part of a said document,
  a step of extracting a geometric characteristic of at least one captured image,
  a step of storing the geometric characteristic extracted,
  for a candidate document where you are seeking to determine whether said printing plate was used to print it, a step of capturing, at high resolution, an image of the part of said candidate document corresponding to the part of the document for which a geometric characteristic has been stored,
  a step of extracting the geometric characteristic of the image of said candidate document corresponding to the stored geometric characteristic and
  a step of determining whether a correlation measurement of the geometric characteristic for said candidate document and the stored geometric characteristic is greater than a pre-defined limit value.

In embodiments, the process comprises, in addition, a step of determining an overall geometric characteristic for each print made by said plate, a step of storing said geometric characteristic and, for the candidate document, a step of determining the overall geometric characteristic corresponding to the stored overall geometric characteristic and a step of determining the highest correlation of the stored geometric characteristic with the geometric characteristic of the candidate document.

For preference, a step of generating an image to be printed with said plate is utilized, said image comprising a plurality of dots not touching each other, as described above.

FIG. 34 illustrates steps in another embodiment of the process determining the plate used for a print of a document.

First of all a step 851 consists in generating an image to be printed, for example a matrix as described above.

Then, during a step 852, a printing plate is marked with said image to be printed.

During a step 854, at least one document is printed with said plate.

During a step 855, a capture, at high resolution, is carried out of at least one image of at least one part of a document bearing a print made during step 854.

During a step 856, a geometric characteristic of at least one image captured during step 855 is extracted. For example, a corner of the printed image is identified and, based on this corner, a specific dot of the printed image is identified. For example, the contour of the dot is extracted and a vector is realized representing the distance of the contour to the dot's centre of gravity, according to the angle. For preference, several images captured at high resolution during step 855 are used to form an average of the characteristics of the same dot in the different images.

During a step 857, the geometric characteristic extracted during step 856 is stored, for example in a database.

During the search for whether a document is legitimate and which plate was used to print it, during a step 860, a capture, at high resolution, is carried out of one image of one part of the document corresponding to the document part utilized during steps 855 to 857.

During a step 861, the geometric characteristic of the image captured during step 855 is extracted. For example, a corner of the printed image is identified and, based on this corner, a specific dot of the printed image is identified. For preference the same algorithms are utilized as those utilized in step 856. For preference, several images captured at high resolution during step 861 are used to form an average of the characteristics of the same dot in the different images.

During a step 862, the geometric characteristic extracted during step 861 is stored, for example in the database used during step 857.

During a step 863, a correlation measurement is carried out of the geometric characteristic determined during step 861 and the geometric characteristics of corresponding dots stored from step 857.

During a step 864, the highest correlation is determined.

During a step 865, it is determined whether this correlation is greater than a limit value, or "threshold" value, for example 0.15. If yes, during a step 866, the document is deemed to be legitimate and to have been printed with the plate that printed the dot representing the highest correlation. If not, during a step 867, the document is deemed to be illegitimate. Possibly, by comparison with a second threshold, you determine whether it is a copy made from a document printed with the plate that printed the dot presenting the highest correlation.

It is observed that, in order to identify one piece of work (a print series with the plate not removed), among several pieces of work carried out with the same plate, it is preferable to use a large number of dots and a higher image resolution than for simply identifying the plate.

In effect, even if the plate was initially legitimate, it could have been stolen and used to print illegitimate documents. Its mechanical history, its corrosion and any fouling can be found in a work signature that is more difficult to distinguish (or identify) than the simple signature of the plate.

FIG. 15 illustrates a particular embodiment of the device that is the subject of this invention. This device 201, for example a micro-computer and its various peripherals, comprises a communications interface 218 linked to a communications network 202 able to transmit and receive digital data. The device 201 also comprises a means of storage 214 such as, for example, a hard disk. It also comprises a floppy-disk reader 215. The floppy disk 224 can contain data to be processed or being processed as well as the code of a program implementing the present invention, code that, once read by the device 101, is stored on the hard disk 114. According to a variant, the program enabling the device to utilize the present invention is stored in read-only memory 110 (called ROM, acronym for "read-only memory"). In a second variant, the program may be received in order to be stored in the same way as that described above by means of the communications network 202.

The device 201 has a screen 212 making it possible to view the processing results and interact with the device, for example by means of graphical interfaces. By means of the keyboard 213, the user can supply data, surface areas, densities, resolutions, values of parameters or keys, or make implementation choices. The central processing unit 211 (called "CPU", acronym for "central processing unit", on the drawing) executes the instructions relating to the utilization of the invention, instructions stored in the read-only memory 210 or in the other storage elements. During powering up, the programs relating to the utilization of the device that is the subject of this invention stored in non-volatile memory, for example ROM 210, are transferred into the random-access memory RAM 217, which then contains the executable code of the program that is the subject of this invention and the registers for memorizing the variables required for utilizing the invention. Obviously, the floppy disks 224 can be replaced by any data carrier such as a compact disk or a memory card. More generally, a means for storing information, readable by a computer or a microprocessor, integrated or not to the device, possibly removable, memorizes a program utilizing the process that is the subject of this invention. The communications bus 221 enables communication between the various elements included in the micro-computer 201 or linked to it. The representation of the bus 221 is not limiting and, in particular, the central processing unit 211 is capable of communicating instructions to any element of the micro-computer 201 directly or by means of another element of the micro-computer 201.

The invention claimed is:

1. An analogical mark printed on a document that comprises a distribution of dots defined by a digital file, having, as a result of unanticipated unknowns in printing, an unpredictable variation, dot by dot, of at least one geometric characteristic of the printed dots wherein dots of said distribution of dots have, in the digital file, at least one geometric characteristic that digitally varies among dots, the geometric amplitude of the digital variation
    having the order of magnitude of said unpredictable variation and
    being less than an average dimension of the dots of the distribution of dots.

2. An analogical mark according to claim 1, wherein at least half the dots of said distribution are not laterally juxtaposed to more than two other dots of said dot distribution.

3. An analogical mark according to claim 2, wherein at least half the dots of said distribution are not laterally juxtaposed to any other dot of said distribution of dots.

4. An analogical mark according to claim 3, wherein at least half of the dots of said distribution of dots do not touch any other dot of said distribution of dots.

5. An analogical mark according to claim 1, wherein at least one geometric characteristics that varies as a result of the digital definition of said dots is a position of dots, in at least one direction, with respect to a position where the centers of the dots are aligned on parallel lines perpendicular to said direction and separated by at least one dimension of said dots in that direction.

6. An analogical mark according to claim 1, wherein at least one geometric characteristics that varies as a result of the digital definition of said dots is a size of dots, in at least one direction with respect to an average size of the dots in the distribution of dots.

7. An analogical mark according to claim 1, wherein at least one geometric characteristics that varies as a result of the digital definition of said dots is a ratio of sizes of dots, in two perpendicular directions with respect to an average ratio of sizes of the dots in said perpendicular directions, in the distribution of dots.

8. An analogical mark according to claim 1, wherein said distribution of dots represents coded information.

9. An analogical mark according to claim 8, wherein said geometric amplitude of the digital variations represents coded information.

10. An analogical mark printed on a document that comprises a distribution of dots defined by a digital file, having, as a result of unanticipated unknowns in printing, an unpredictable variation, dot by dot, of at least one geometric characteristic of the printed dots wherein dots of said distribution of dots have at least one geometric characteristic that varies as a result of the digital definition of said dots, a geometric amplitude of the variation resulting from the digital having the digital definition
    having the order of magnitude of said unpredictable variation and
    being less than an average dimension of the dots of the distribution of dots.

11. An analogical mark according to claim 10, wherein at least half the dots of said distribution are not laterally juxtaposed to more than two other dots of said dot distribution.

12. An analogical mark according to claim 11, wherein at least half the dots of said distribution are not laterally juxtaposed to any other dot of said distribution of dots.

13. An analogical mark according to claim 12, wherein at least half of the dots of said distribution of dots do not touch any other dot of said distribution of dots.

14. An analogical mark according to claim 10, wherein at least one geometric characteristics that varies as a result of the digital definition of said dots is a position of dots, in at least one direction, with respect to a position where the centers of the dots are aligned on parallel lines perpendicular to said direction and separated by at least one dimension of said dots in that direction.

15. An analogical mark according to claim 10, wherein at least one geometric characteristics that varies as a result of the digital definition of said dots is a size of dots, in at least one direction with respect to an average size of the dots in the distribution of dots.

16. An analogical mark according to claim 10, wherein at least one geometric characteristics that varies as a result of the digital definition of said dots is a ratio of sizes of dots, in two perpendicular directions with respect to an average ratio of sizes of the dots in said perpendicular directions, in the distribution of dots.

17. An analogical mark according to claim 10, wherein said distribution of dots represents coded information.

18. An analogical mark according to claim 17, wherein said geometric amplitude of the digital variations represents coded information.

\* \* \* \* \*